US010344190B2

(12) United States Patent
Houillot et al.

(10) Patent No.: US 10,344,190 B2
(45) Date of Patent: Jul. 9, 2019

(54) BINDERS FOR FLOORING ADHESIVES

(71) Applicant: BASF SE, Ludwigshafen (DE)

(72) Inventors: Lisa Houillot, Mannheim (DE); Valerie Wilms, Mannheim (DE); Paola Uribe Arocha, Neustadt (DE); Maximillian Ruellmann, Heppenheim (DE); Matthias Gerst, Maikammer (DE)

(73) Assignee: BASF SE, Ludwigshafen (DE)

( * ) Notice: Subject to any disclaimer, the term of this patent is extended or adjusted under 35 U.S.C. 154(b) by 146 days.

(21) Appl. No.: 15/326,369

(22) PCT Filed: Jul. 13, 2015

(86) PCT No.: PCT/EP2015/065946
§ 371 (c)(1),
(2) Date: Jan. 13, 2017

(87) PCT Pub. No.: WO2016/008834
PCT Pub. Date: Jan. 21, 2016

(65) Prior Publication Data
US 2017/0204305 A1    Jul. 20, 2017

(30) Foreign Application Priority Data

Jul. 15, 2014 (EP) .................................. 14177022

(51) Int. Cl.
| | |
|---|---|
| *C09J 103/02* | (2006.01) |
| *C08L 3/02* | (2006.01) |
| *C08L 33/08* | (2006.01) |
| *C09J 4/00* | (2006.01) |
| *C09J 105/00* | (2006.01) |
| *C09J 133/06* | (2006.01) |
| *C09J 101/02* | (2006.01) |
| *C09J 133/08* | (2006.01) |
| *C08L 33/06* | (2006.01) |

(52) U.S. Cl.
CPC ............... *C09J 103/02* (2013.01); *C08L 3/02* (2013.01); *C08L 33/06* (2013.01); *C08L 33/08* (2013.01); *C09J 4/00* (2013.01); *C09J 101/02* (2013.01); *C09J 105/00* (2013.01); *C09J 133/06* (2013.01); *C09J 133/08* (2013.01)

(58) Field of Classification Search
CPC ............ C09J 103/02; C08L 3/02; C08L 33/08
USPC ......................................................... 524/53
See application file for complete search history.

(56) References Cited

U.S. PATENT DOCUMENTS

| | | |
|---|---|---|
| 2,520,959 A | 9/1950 | Powers |
| 3,238,173 A | 3/1966 | Bailey et al. |
| 3,360,599 A | 12/1967 | Nyberg et al. |
| 3,397,165 A | 8/1968 | Goodman et al. |
| 3,726,824 A | 4/1973 | Saunders et al. |
| 3,734,686 A | 5/1973 | Douglas |
| 4,269,749 A | 5/1981 | Marriott et al. |
| 5,756,574 A | 5/1998 | Baumstark et al. |
| 5,994,457 A | 11/1999 | Stanger et al. |
| 6,207,756 B1 | 3/2001 | Datta et al. |
| 7,112,626 B1 | 9/2006 | Fickeisen et al. |
| 2002/0135086 A1* | 9/2002 | Hashemzadeh ..... B29B 17/0042 264/37.28 |
| 2011/0312240 A1* | 12/2011 | Amthor .............. C09D 133/066 442/327 |
| 2012/0225978 A1 | 9/2012 | Krueger et al. |

(Continued)

FOREIGN PATENT DOCUMENTS

| | | |
|---|---|---|
| DE | 40 03 422 A1 | 8/1991 |
| DE | 44 35 422 A1 | 4/1996 |

(Continued)

OTHER PUBLICATIONS

International Search Report dated Sep. 14, 2015 in PCT/EP15/065946 Filed Jul. 13, 2015.

(Continued)

*Primary Examiner* — Deve E Valdez
(74) *Attorney, Agent, or Firm* — Oblon, McClelland, Maier & Neustadt, L.L.P.

(57) ABSTRACT

The present invention relates to a polymer dispersion comprising A) at least one first phase comprising a) at least one chain growth addition polymer P constructed from 1 to 99.9 wt % of at least one ester from ethylenically unsaturated monomers, as monomer A, 0 to 20 wt % of at least one ethylenically unsaturated carbonitrile, as monomer B, 0.1 to 5 wt % of at least one acid-functional ethylenically unsaturated monomer, as monomer C, 0 to 5 wt % of at least one monomer which, alone or with a crosslinking agent, has crosslinking effect and which is different from the monomers A to C, as monomer D, 0 to 20 wt % of at least one ethylenically unsaturated monomer which forms a chain growth addition homopolymer having a glass transition temperature ≥50° C. and which is different from the monomers A to D, as monomer E, the sum of the total amount of the monomers A to E making 100 wt %, a1) optionally at least one polymer seed, b) 10 to 60 parts by weight, based on 100 parts by weight of polymer P, of at least one saccharide compound S, and B) a second phase comprising c) at least one solvent. The present invention also relates to a method for producing the polymer dispersion of the invention, to a polymerization powder, to an adhesive bonding formulation comprising the polymer dispersion of the invention, and to the use of the formulation of the invention as an adhesive.

18 Claims, No Drawings

(56) References Cited

U.S. PATENT DOCUMENTS

| | | | | |
|---|---|---|---|---|
| 2012/0252936 A1* | 10/2012 | Kruger | ................... | C09J 133/20 524/28 |
| 2013/0210967 A1* | 8/2013 | Krueger | ................ | C08L 97/005 524/73 |
| 2014/0131913 A1 | 5/2014 | Krueger et al. | | |

FOREIGN PATENT DOCUMENTS

| | | |
|---|---|---|
| DE | 196 24 299 A1 | 1/1997 |
| DE | 196 21 027 A1 | 11/1997 |
| DE | 197 25 038 A1 | 12/1998 |
| DE | 197 41 184 A1 | 3/1999 |
| DE | 197 41 187 A1 | 3/1999 |
| DE | 198 05 122 A1 | 4/1999 |
| DE | 198 28 183 A1 | 12/1999 |
| DE | 198 39 199 A1 | 3/2000 |
| DE | 198 40 586 A1 | 3/2000 |
| EP | 0 441 197 A2 | 8/1991 |
| EP | 0 771 328 A | 5/1997 |
| EP | 0 789 724 | 8/1997 |
| WO | 95/33775 A1 | 12/1995 |
| WO | 2007/020201 A2 | 2/2007 |
| WO | 2012/117017 A1 | 9/2012 |
| WO | 2012/136605 A1 | 10/2012 |
| WO | 2013/045259 A1 | 4/2013 |

OTHER PUBLICATIONS

International Preliminary Report on Patentability dated Jan. 19, 2017 in PCT/EP2015/065946 filed Jul. 13, 2015 (English translation only).

* cited by examiner

BINDERS FOR FLOORING ADHESIVES

The present invention relates to a polymer dispersion comprising A) at least one first phase comprising a) at least one chain growth addition polymer P constructed from 1 to 99.9 wt % of at least one ester from ethylenically unsaturated monomers, as monomer A, 0 to 20 wt % of at least one ethylenically unsaturated carbonitrile, as monomer B, 0.1 to 5 wt % of at least one acid-functional ethylenically unsaturated monomer, as monomer C, 0 to 5 wt % of at least one monomer which, alone or with a crosslinking agent, has crosslinking effect and which is different from the monomers A to C, as monomer D, 0 to 20 wt % of at least one ethylenically unsaturated monomer which has a chain growth addition homopolymer having a glass transition temperature 50° C. and which is different from the monomers A to D, as monomer E, the sum of the total amount of the monomers A to E making 100 wt %, a1) optionally at least one polymer seed, b) 10 to 60 parts by weight, based on 100 parts by weight of polymer P, of at least one saccharide compound S, and B) a second phase comprising c) at least one solvent. The present invention also relates to a method for producing the polymer dispersion of the invention, to a polymerization powder, to an adhesive bonding formulation comprising the polymer dispersion of the invention, and to the use of the formulation of the invention as an adhesive.

Chain growth addition polymer dispersions, particularly aqueous systems, are common knowledge. They are fluid systems comprising dispersed particles of chain growth addition polymer in the form of a disperse phase in the aqueous dispersing medium. These polymer particles consist of a plurality of intertwined chains of polymer, and are also referred to as polymer latex. Aqueous chain growth addition polymer dispersions are used across a plethora of technical applications, as binders, for example.

Fundamental requirements asked of adhesives, binders, and flooring adhesives too are for effective adhesion of the adhesive to the substrate and effective cohesion in the layer of adhesive. Optimizing these properties at one and the same time presents problems, since in general an improvement in the adhesive properties is accompanied by a reduction in the cohesive properties of an adhesive, and vice versa.

With flooring adhesives there are emissions to be borne in mind as well as the mechanical requirements. The emissions ought to be kept as low as possible, this being achievable by not using any solvents, or high-boiling solvents, in the formulation. In this respect, the following aqueous binders are considered to be state of the art for flooring adhesives: WO2007020201, U.S. Pat. No. 7,112,626, DE19725038.

WO 2012/117017 A1 describes an aqueous binder composition comprising
a) at least one chain growth addition polymer P constructed from at least one acid-functional ethylenically unsaturated monomer, at least one ethylenically unsaturated carbonitrile or carbodinitrile, at least one monomer with crosslinking effect that has at least two nonconjugated ethylenically unsaturated groups, at least one α,β-monoethylenically unsaturated $C_3$ to $C_6$ mono- or dicarboxamide, at least one ethylenically unsaturated monomer which has a homopolymer with a glass transition temperature ≤30° C. and which differs from the monomers specified above, and at least one ethylenically unsaturated monomer which has a homopolymer with a glass transition temperature 50° C. and which likewise differs from the monomers above, in copolymerized form, and
b) at least one saccharide compound S.

The possible uses for this binder composition include a binder for adhesives or for flooring adhesives. In that context, however, the adhesive properties are not all satisfactory, something attributable to the binder composition, since it comprises at least 30 wt % of an ethylenically unsaturated monomer which has a homopolymer with a glass transition temperature ≥50° C.

Particularly important for flooring adhesives are the adhesive properties in the wet and dry states. This means that the adhesive must exhibit sufficient tack both in the first minutes after laying of the adhesive, and after a prolonged venting time. These two properties, referred to as wet grab and dry grip, are mutually contradictory. An improvement in the one property has hitherto always entailed a deterioration in the other.

It was an object of the present invention, therefore, to provide a chain growth addition polymer dispersion which eliminates the disadvantages of the prior art. The intention more particularly was to provide a polymer dispersion based advantageously on a chain growth addition emulsion polymer and suitable as binder for an adhesive, especially for a flooring adhesive. With an adhesive formulation of this kind, improved dry grip can be achieved with no loss of wet grab.

The object is achieved by means of a polymer dispersion comprising
A) at least one first phase comprising
a) at least one chain growth addition polymer P constructed from
  1 to 99.9 wt % of at least one ester from ethylenically unsaturated monomers, as monomer A,
  0 to 20 wt % of at least one ethylenically unsaturated carbonitrile, as monomer B,
  0.1 to 5 wt % of at least one acid-functional ethylenically unsaturated monomer, as monomer C,
  0 to 5 wt % of at least one monomer which, alone or with a crosslinking agent, has crosslinking effect and which is different from the monomers A to C, as monomer D,
  0 to 20 wt % of at least one ethylenically unsaturated monomer which has a chain growth addition homopolymer having a glass transition temperature 50° C. and which is different from the monomers A to D, as monomer E,
the sum of the total amount of the monomers A to E making 100 wt %,
a1) optionally at least one polymer seed,
b) 10 to 60 parts by weight, based on 100 parts by weight of polymer P, of at least one saccharide compound S, and
B) a second phase comprising
c) at least one solvent.

The object is further achieved by the method of the invention for producing the polymer dispersion of the invention, the formulation of the invention for adhesive bonding, and the inventive use of the formulation as adhesive, in accordance with the features from the claims.

A dispersion in the sense of the present invention comprehends a commixture of substances which are not joined chemically to one another. In a dispersion, one substance (dispersed phase, disperse phase, or secondary phase) is present in extremely fine division in another substance (dispersion medium or continuous phase).

In the sense of the present invention, the first phase may represent the disperse phase, and the second phase the dispersion medium.

The chain growth addition polymer P and the solvent, water for example, may form a dispersion. The polymer P may be in solid or liquid form. The polymer P is preferably liquid. The polymer dispersion of the invention may also be termed an aqueous polymer dispersion or aqueous emulsion polymer.

A chain growth addition polymer P in the sense of the present invention may be understood as a mixture of polymers produced in a formation reaction from monomers to give macromolecules.

In the sense of the present invention, "chain growth addition polymer P constructed from" means that the chain growth addition polymer is constructed exclusively of the monomers A and C and optionally of the monomers B, D, and E. The polymer P is preferably constructed from the monomers consisting of the monomers A and C and optionally B, D, and E.

The chain growth addition polymer P is prepared in a way familiar in principle to the skilled person, as for example by radical polymerization of the monomers A to E by the method of bulk, emulsion, solution, precipitation, or suspension polymerization, although radically initiated aqueous emulsion polymerization is especially preferred. Advantageously in accordance with the invention, therefore, the polymer P may be dispersed in an aqueous medium, thus being used in the form of an aqueous polymer dispersion. The procedure for radically initiated emulsion polymerizations of monomers in an aqueous medium has been extensively described and is therefore sufficiently familiar to the skilled person [cf. in this regard Emulsion Polymerization in Encyclopedia of Polymer Science and Engineering, vol. 8, pages 659 ff. (1987); D. C. Blackley, in High Polymer Latices, vol. 1, pages 35 ff. (1966); H. Warson, The Applications of Synthetic Resin Emulsions, chapter 5, pages 246 if. (1972); D. Diederich, Chemie in unserer Zeit 24, pages 135 to 142 (1990); Emulsion Polymerisation, Interscience Publishers, New York (1965); DE-A 40 03 422; and Dispersionen synthetischer Hochpolymerer, F. Hölscher, Springer-Verlag, Berlin (1969)]. The radically initiated aqueous emulsion polymerization is typically conducted by dispersing the ethylenically unsaturated monomers in the aqueous medium, optionally with accompanying use of dispersing assistants, such as emulsifiers and/or protective colloids, and polymerizing this system using at least one water-soluble radical initiator of chain growth addition polymerization. In the aqueous polymer dispersions obtained, the residual levels of unreacted ethylenically unsaturated monomers are often lowered by chemical and/or physical methods that are likewise known to the skilled person [see, for example, EP-A 771328, DE-A 19624299, DE-A 19621027, DE-A 19741 184, DE-A 19741 187, DE-A 19805122, DE-A 19828183, DE-A 19839199, DE-A 19840586, and 198471 15], the chain growth addition polymer solids content is adjusted to a desired level by dilution or concentration, or the aqueous polymer dispersion is admixed with further customary adjuvants, such as bactericidal additives, foam-modifying additives or viscosity-modifying additives, for example. The preparation of an aqueous dispersion of the chain growth addition polymer P in accordance with the present invention may differ from this general procedure only in the specific use of the aforementioned monomers A to E. It will be appreciated here that the preparation of the chain growth addition polymer P shall, for the purposes of the present specification, also encompass the seed, staged, one-shot, and gradient regimes which are familiar to the skilled person.

In principle, of course, aqueous chain growth addition polymer dispersions may also be prepared in the form of what are called secondary polymer dispersions (regarding the fundamental preparation of secondary polymer dispersions, see, for example, Eckersley et al., Am. Chem. Soc., Div. Polymer Chemistry, 1977, 38(2), pages 630, 631, US-A 3360599, US-A 3238173, US-A 3726824, US-A 3734686 or US-A 6207756). The secondary aqueous chain growth addition polymer dispersions are generally prepared by dissolving the chain growth addition polymers P, prepared by the method of bulk or solution polymerization, in a suitable organic solvent, and dispersing them into an aqueous medium with formation of aqueous polymer/solvent (mini-) emulsions. Subsequent removal of solvent yields the corresponding aqueous polymer dispersions.

In accordance with the invention the dispersion is an (aqueous) polymer dispersion, meaning that the polymer is present as a dispersed phase in the form of finely divided particles within a continuous phase. The continuous phase, as well as comprising water and also the auxiliaries typically employed in preparation, such as surface-active substances (emulsifiers), acids, bases, decomposition products from the chain growth addition polymerization reaction, deodorizing compounds, and chain transfer agents, may further comprise small amounts of watermiscible organic solvents. The fraction of these stated components will typically not exceed 5 wt %, based on the total weight of the polymer dispersion. The fraction of the respective individual component will typically not exceed 1.5 wt %, based on the total weight of the polymer dispersion.

Chain growth addition polymerization initiators contemplated include all those capable of triggering a radical aqueous chain growth addition polymerization, particularly an emulsion polymerization. These initiators may be peroxides, examples being alkali metal peroxydisulfates, or $H_2O_2$, or else azo compounds.

The polymer dispersion of the invention may comprise the breakdown products of a polymerization initiator. This may be the case after the polymerization reaction, for example.

Also suitable are combined systems composed of at least one organic reducing agent and at least one peroxide and/or hydroperoxide, examples being tert-butyl hydroperoxide and the sodium metal salt of hydroxymethanesulfinic acid, or hydrogen peroxide and ascorbic acid. Also suitable are combined systems which in addition comprise a small amount of a metal compound which is soluble in the polymerization medium and whose metallic component is able to occur in a plurality of valence states, an example being ascorbic acid/iron(II) sulfate/hydrogen peroxide, in which, instead of ascorbic acid, the sodium metal salt of hydroxymethanesulfinic acid, sodium sulfite, sodium hydrogensulfite or sodium metal bisulfite, and instead of hydrogen peroxide tert-butyl hydroperoxide or alkali metal peroxydisulfates and/or ammonium peroxydisulfates, may often also be employed. In the case of the combined systems it may be judicious to use the saccharide compound S as a reducing component.

The amount of radical initiator systems used, based on the total amount of the monomers A to E that are to be polymerized, is generally 0.1 to 2 wt %.

Particular preference is given to using ammonium peroxydisulfates and/or alkali metal peroxydisulfates, as they are or as part of combined systems, as polymerization initiator. Used with particular preference is sodium peroxydisulfate.

The way in which the polymerization initiator is added to the polymerization vessel in the course of the aqueous chain growth addition emulsion polymerization of the invention is of fairly minor importance. The initiator may be included in its entirety in the initial charge to the polymerization vessel, or else inserted continuously or in stages at the rate at which it is consumed in the course of the aqueous emulsion polymerization. In each case, this will be dependent, in a manner known to a person of ordinary skill in the art, both on the chemical nature of the initiator system and on the polymerization temperature. With preference, a portion is included in the initial charge, and the remainder is supplied to the polymerization zone at the rate it is consumed.

The (radical) aqueous emulsion polymerization may of course also take place under elevated or reduced pressure.

Examples of suitable monomers A are esters of vinyl alcohol and a $C_1$ to $C_{10}$ monocarboxylic acid, $C_1$ to $C_{10}$ alkyl acrylate, $C_5$ to $C_{10}$ alkyl methacrylate, $C_5$ to $C_{10}$ cycloalkyl acrylate and methacrylate, $C_1$ to $C_{10}$ dialkyl maleate and/or $C_1$ to $C_{10}$ dialkyl fumarate, vinyl ethers of $C_3$ to $C_{10}$ alkanols. Used with particular advantage as monomers A are vinyl acetate, methyl acrylate, ethyl acrylate, n-propyl acrylate, isopropyl acrylate, n-butyl acrylate, isobutyl acrylate, sec-butyl acrylate, tert-butyl acrylate, n-hexyl acrylate, 2-ethylhexyl acrylate, n-hexyl methacrylate, 2-ethylhexyl methacrylate, di-n-butyl maleate, and di-n-butyl fumarate, with 2-ethylhexyl acrylate, n-butyl acrylate, and ethyl acrylate being especially preferred. Preference is given to using 2-ethylhexyl acrylate and/or n-butyl acrylate.

The monomer A preferably comprises 2 to 90 wt % of at least one ester from ethylenically unsaturated monomers as monomer A, very preferably 30 to 90 wt % of at least one ester from ethylenically unsaturated monomers A.

Contemplated as monomers B are all ethylenically unsaturated compounds which have at least one nitrile group. Advantageously, however, the monomers B comprise the nitriles which derive from the aforementioned α,β-monoethylenically unsaturated, particularly $C_3$ to $C_6$, preferably $C_3$ or $C_4$, monocarboxylic or dicarboxylic acids, such as acrylonitrile, methacrylonitrile, maleonitrile and/or fumaronitrile, with acrylonitrile and/or methacrylonitrile being particularly preferred.

The monomer B preferably comprises 2 to 18 wt % of at least one ethylenically unsaturated carbonitrile, very preferably 7 to 12 wt % of at least one ethylenically unsaturated carbonitrile.

In the present invention, the term "carbonitrile" subsumes not only components having one nitrile group, but also those having two nitrile groups, known as dinitriles.

Contemplated as monomers C are all ethylenically unsaturated compounds which have at least one acid group (proton donor), such as a sulfonic, phosphonic, or carboxylic acid group, such as vinylsulfonic acid, allylsulfonic acid, styrenesulfonic acid, 2-acrylamidomethylpropanesulfonic acid, vinylphosphonic acid, allylphosphonic acid, styrenephosphonic acid, and 2-acrylamido-2-methylpropanephosphonic acid, for example. Advantageously, however, the monomers C are α,β-monoethylenically unsaturated, especially $C_3$ to $C_6$, preferably $C_3$ or $C_4$, monocarboxylic or dicarboxylic acids such as, for example, acrylic acid, methacrylic acid, ethylacrylic acid, itaconic acid, allylacetic acid, crotonic acid, vinylacetic acid, fumaric acid, maleic acid, and 2-methylmaleic acid. The monomers C, however, also comprise the anhydrides of corresponding α,β-monoethylenically unsaturated dicarboxylic acids, such as maleic anhydride or 2-methylmaleic anhydride, for example. Particular preference is given to acrylic acid and/or methacrylic acid.

The monomer C preferably comprises 0.5 to 4 wt % of at least one acid-functional ethylenically unsaturated monomer as monomer C, very preferably 2 to 3 wt % of at least one acid-functional ethylenically unsaturated monomer.

Contemplated as monomers D are monomers which, on their own or with a crosslinking agent, have crosslinking effect. These monomers D, which customarily increase the internal strength of films formed from aqueous chain growth addition polymer dispersions, normally have at least one epoxy, hydroxyl, N-methylol or carbonyl or at least two nonconjugated ethylenically unsaturated double bonds. Examples thereof are N-alkylol amides of α,β-monoethylenically unsaturated carboxylic acids having 3 to 10 C atoms, and also their esters with alkanols having 1 to 4 C atoms, very preferably N-methylolacrylamide and N-methylolmethacrylamide, monomers having two vinyl radicals, monomers having two vinylidene radicals, and monomers having two alkenyl radicals. Particularly advantageous here are the diesters of dihydric alcohols with α,β-monoethylenically unsaturated monocarboxylic acids, preferably acrylic acid and methacrylic acid. Examples of such monomers having two nonconjugated ethylenically unsaturated double bonds are alkylene glycol diacrylates and dimethacrylates such as ethylene glycol diacrylate, 1,3-butylene glycol diacrylate, 1,4-butylene glycol diacrylate, and also propylene glycol diacrylate, divinylbenzene, vinyl methacrylate, vinyl acrylate, allyl methacrylate, allyl acrylate, diallyl maleate, diallyl fumarate, methylenebisacrylamide, cyclopentadienyl acrylate, or triallyl cyanurate.

Examples of functional crosslinker groups are keto, aldehyde and/or acetoacetoxycarbonyl groups, and the formulated crosslinking agents subsequently added may comprise a polyamine or polyhydrazide such as adipic dihydrazide (ADDH), oxalic dihydrazide, phthalic dihydrazide, terephthalic dihydrazide, isophoronediamine, and 4,7-dioxadecane-1,1-O-diamine, or a crosslinking agent which carries semicarbazide or hydrazine-functional groups. Alternatively the polymer could carry hydrazide-functional groups and the subsequently formulated crosslinking agent could comprise keto-functional groups.

The functional groups may also be carboxyl functions, and the subsequently formulated crosslinking agent could comprise groups with aziridine, epoxide, or carbodiimide functionality, or the functional groups may be silane-functional groups, and the subsequently formulated crosslinking agent may likewise comprise silane-functional groups.

The functional groups can also be ureido groups, and the subsequently added crosslinking agent a polyaldehyde, as for example a α,ω-dialdehyde having one to ten C atoms, such as glyoxal, glutaraldehyde or malonialdehyde, and/or the acetals and hemiacetals thereof; see EP 0789724.

Crosslinking in this case takes place either through reaction with one another or by addition of a further crosslinking agent. Crosslinking preferably does not take place until after actual film formation.

Preferred as monomers D are monomers with silane-functional groups such as vinyltriethoxysilane, vinyltriisopropoxysilane, vinyltrimethoxysilane, methacryloyloxypropyltrimethoxysilane, or oligomeric vinylsilanes (e.g., Dynasylan 6490, Evonik). Further preferred as monomer D are monomers with acetoacetoxycarbonyl groups such as diacetoneacrylamide with subsequently added, formulated crosslinking agent such as, for example, adipic dihydrazide (ADDH). Further preferred are acetoacetoxyethyl methacrylate, glycidyl methacrylate, and ureidomethacrylate. Particularly preferred are vinyltriethoxysilane and also the combination of diacetoneacrylamide with adipic dihydrazide.

It is important here not to use too much additional crosslinking agent, since this can lead to residues of remaining crosslinking agent. Too little crosslinking agent, on the other hand, may lead to a soluble coating.

The monomer D preferably comprises 0.01 to 5 wt % of at least one monomer which, alone or with a crosslinking agent, has crosslinking effect, very preferably 0.05 to 3 wt % of at least one monomer which, alone or with a crosslinking agent, has crosslinking effect.

Contemplated as monomers E are all ethylenically unsaturated monomers which have a chain growth addition homopolymer having a glass transition temperature 50° C. and which differ from the monomers A to D. Examples of suitable monomers E are vinylaromatic monomers and $C_1$ to $C_4$ alkyl methacrylate. Vinylaromatic monomers are understood to be, in particular, derivatives of styrene or of α-methylstyrene in which the phenyl nuclei are optionally substituted by 1, 2, or 3 $C_1$ to $C_4$ alkyl groups, halogen, more particularly bromine or chlorine, and/or methoxy groups. Preferred monomers are those whose homopolymers have a glass transition temperature >80° C. Particularly preferred monomers are styrene, α-methylstyrene, o- or p-vinyltoluene, p-acetoxystyrene, p-bromostyrene, p-tert-butylstyrene, o-, m-, or p-chlorostyrene, methyl methacrylate, tert-butyl acrylate, tert-butyl methacrylate, ethyl methacrylate, isobutyl methacrylate, cyclohexyl methacrylate, but also, for example, tert-butyl vinyl ether or cyclohexyl vinyl ether, although methyl methacrylate, styrene and/or tert-butyl methacrylate are especially preferred.

The monomer E preferably comprises 0.01 to 19 wt % of an ethylenically unsaturated monomer, very preferably 1 to 10 wt % of an ethylenically unsaturated monomer.

The sum total of the monomers A to E in the chain growth addition polymer P makes 100 wt %. In other words, the corresponding fractions of the monomers A to E make up in total 100 wt %, in order to form the chain growth addition polymer P.

A saccharide compound S for the purposes of the present specification means monosaccharides, oligosaccharides, polysaccharides, sugar alcohols, and also substitution products and derivatives of the aforementioned compounds. The meaning of the saccharide compound S for the purposes of the present invention also comprehends "sugared starch" or "saccharide".

Monosaccharides are organic compounds of the generic formula $C_nH_nO_n$, where n is an integer 5, 6, 7, 8, or 9. These monosaccharides are also referred to as pentoses, hexoses, heptoses, octoses, or nonoses, and these compounds may be subdivided into the corresponding aldoses, which have an aldehyde group, and ketoses, which have a keto group. Accordingly, the monosaccharides comprise aldo- or keto-pentoses, aldo- or ketohexoses, aldo- or ketoheptoses, aldo- or ketooctoses, or aldo- or ketononoses. Monosaccharide compounds preferred in accordance with the invention are the pentoses and hexoses which also occur in nature, of which glucose, mannose, galactose and/or xylose are particularly preferable. It will be appreciated that the invention also comprehends all stereoisomers of all aforementioned monosaccharides.

Compounds constructed from at least two but not more than ten monosaccharide structural units via glycosidic links are termed oligosaccharides. Preferred oligosaccharides are the disaccharides, of which lactose, maltose and/or sucrose are particularly preferred. It will be appreciated that the invention also comprehends all stereoisomers of all aforementioned oligosaccharides.

Saccharide compounds constructed from more than ten monosaccharide structural units are referred to for the purposes of this specification as polysaccharide compounds. The polysaccharide compounds here may be constructed from the structural elements of a monosaccharide (known as homoglycans) or from the structural elements of two or more different monosaccharides (known as heteroglycans). Homoglycans are used preferably in accordance with the invention. Particular preference among the homoglycans is given to the starches constructed from [alpha]-D-glucose units. The starches consist of the polysaccharides amylose (D-glucose units linked α-1,4-glycosidically to one another) and amylopectin (D-glucose units linked α-1,4- and additionally, to an extent of approximately 4%, α-1,6-glycosidically to one another). Naturally occurring starch normally comprises about 20 to 30 wt % amylose and about 70 to 80 wt % amylopectin. As a result of cultivation, and varying according to species of plant, however, the ratio between amylose and amylopectin may be altered.

The sugar alcohols are the hydrogenation products of the aforementioned aldo- or keto-pentoses, -hexoses, -heptoses, -octoses, or -nonoses, which have the generic formula $C_nH_{2n}O_n$, where n is an integer 5, 6, 7, 8, or 9. Preferred sugar alcohols are mannitol, lactitol, sorbitol and/or xylitol. It will be appreciated that the invention also comprehends all stereoisomers of all aforementioned sugar alcohols.

The term "saccharide compound S" also, of course, comprises the substitution products and derivatives of the aforementioned mono-, oligo-, and polysaccharide compounds and also of the sugar alcohols. The substitution products of a saccharide compound S are understood to be those in which at least one hydroxyl group of the saccharide compound S has been functionalized while leaving the saccharide structure intact, such functionalization having been accomplished by means, for example, of esterification, etherification, oxidation, etc.

Starch degradation products obtainable by hydrolysis in aqueous phase, and called chemically modified degraded starch, with a weight-average molecular weight of 2500 to 25 000, are customarily referred to as sugared starches, in contradistinction to the roast dextrins, and are commercially available as such (e.g., products from Cerestar Deutschland GmbH, D-1150 Krefeld 12).

One chemical difference between saccharides of this type and the roast dextrins is that with hydrolytic degradation in an aqueous medium (typically suspensions or solutions), generally performed at solids contents of 10 to 30 wt % and also, preferably, under acid or enzyme catalysis, there is essentially no possibility of recombination and branching, as is also reflected not least in different molecular weight distributions.

The preparation of the saccharide compound S (sugared starch) is general knowledge and has been described inter alia in Günther Tegge, Stärke and Stärkederivate, Behr's Verlag, Hamburg 1984, p. 173 and p. 220 ff, and also in EP-A 441 197. The saccharide compound S for use in accordance with the invention is preferably a saccharide compound whose weight-average molecular weight $M_w$ is in the range from 4000 to 16 000, more preferably in the range from 6500 to 13 000.

The saccharide compound S for use in accordance with the invention is normally completely soluble in water at room temperature, with the solubility limit generally being above 50 wt %, as will be found particularly advantageous when it comes to preparing the aqueous dispersions of the invention.

It has further proven favorable if the saccharides S for use in accordance with the invention have a dispersity D (defined as the ratio of weight-average molecular weight $M_w$ to number-average molecular weight $M_n$; D characterizes the molecular weight distribution) in the range from 6 to 12. With particular advantage, D is 7 to 11, and especially favorable is a D of 8 to 10.

It is of advantage, furthermore, if the weight fraction of the saccharide compound S for use in accordance with the invention and having a molecular weight of less than 1000 is at least 10 wt %, but not more than 70 wt %. It is particularly preferable for this weight fraction to be in the range from 20 to 40 wt %.

Initial starches suitable for preparing the saccharide compound S for use in accordance with the invention are in principle all native starches such as cereal starches (e.g., corn (maize), wheat, rice, or millet), tuber starches and root starches (e.g., potatoes, tapioca roots, or arrowroot) or sago starches.

One significant advantage of the saccharide compound S is that, apart from the very simple-to-perform partial hydrolysis of the initial starch to form the saccharide compound S, it requires no further chemical modification to be useful. It will be appreciated, however, that it may also be used in the present invention in a chemically modified form resulting from etherification or esterification, for example. This chemical modification may also have already been performed on the initial starch prior to degradation thereof. Esterifications are possible not only with inorganic but also with organic acids, their anhydrides or chlorides. Of particular interest are phosphated and acetylated degraded starches. The most commonly employed method of etherification involves treatment with organic halogen compounds, epoxides or sulfates in aqueous alkaline solution. Particularly suitable ethers are alkyl ethers, hydroxyalkyl ethers, carboxyalkyl ethers, and allyl ethers. Also contemplated, furthermore, are reaction products with 2,3-epoxypropyltrimethylammonium chloride.

The saccharide compound S generally has a weight-average molecular weight in the range >1000 and <5 000 000 g/mol, advantageously in the range >1000 and <500 000 g/mol, preferably in the range >3000 and <50 000 g/mol, and especially preferably in the range >5000 and <25 000 g/mol. The determination of the weight-average molecular weight here takes place by means of gel permeation chromatography, familiar to the skilled person, using defined standards.

The saccharide compound S preferably has a solubility of >10 g, advantageously >50 g, and especially advantageously >100 g per liter of deionized water at 20° C. under atmospheric pressure. Also encompassed, however, are embodiments in which the saccharide compound S has a solubility <10 g per liter of deionized water at 20° C. under atmospheric pressure. Depending on the amount of these saccharide compounds S employed, they may then also be present in the form of their aqueous suspension. If a saccharide compound S is used such that it is present in aqueous suspension, it is advantageous for the saccharide compound S particles in suspension in the aqueous medium to have an average particle diameter ≤5 μm, preferably ≤3 μm, and especially preferably ≤1 μm. The average particle diameters are determined by the method of quasi-elastic light scattering (ISO standard 13 321).

The total amount of the saccharide compound S may be added to the aqueous polymerization medium (monomers A to E, water, and optionally initiator) before, during or after the emulsion polymerization of the monomers A to E of the aqueous dispersion of the polymer P. As will be appreciated, it is also possible to add merely a portion of the saccharide compound S to the aqueous polymerization medium before or during the emulsion polymerization of the monomers A to E, and to add the remainder to the aqueous dispersion of the chain growth addition polymer P after the end of the emulsion polymerization. If some or all of the saccharide compound S is added before, during, or after the emulsion polymerization of the monomers A to E, it may generally take on the function of the protective colloid, as a result of which it is possible to reduce the amount of other protective colloids and/or emulsifiers, and/or to do without them entirely, optionally.

The chain growth addition polymer dispersion comprises 10 to 60 parts by weight, based on 100 parts by weight of chain growth addition polymer P, of at least one saccharide compound S. The amount of the saccharide compound S is therefore 10 to 60 parts by weight per 100 parts by weight of polymer P.

In the first phase, 20 to 55 parts by weight of saccharide compound S, based on 100 parts by weight of chain growth addition polymer P, are preferably present, very preferably 30 to 45 parts by weight, based on 100 parts by weight of chain growth addition polymer P.

The polymer dispersion of the invention comprises at least one first phase optionally comprising at least one polymer seed. The polymer seed may occur in an amount of 0 to 3 parts by weight, based on 100 parts by weight of chain growth addition polymer P, more particularly 0.01 to 3 parts by weight, based on 100 parts by weight of polymer P.

The polymer dispersion of the invention comprises a second phase comprising c) at least one solvent. Preferred solvents are protic polar solvents. Alcohols and water are especially preferred. Water is very particularly preferred. The solvent preferably corresponds to the dispersion medium.

A preferred polymer dispersion of the invention is one in which the polymer dispersion is an aqueous polymer dispersion. An aqueous polymer dispersion here means a polymer dispersion in which the dispersion medium is made up at least of 50 parts by weight of water, more preferably 90 parts by weight of water, and especially preferably more than 99 parts by weight of water.

The polymer dispersion of the invention preferably comprises at least one emulsifier. The polymer dispersion of the invention advantageously comprises 0.1 to 10 parts by weight of emulsifier, based on 100 parts by weight of polymer P, more particularly 0.1 to 5 parts by weight of emulsifier. The emulsifier in this case differs from the saccharide compound S and also from any protective colloid that may be employed and that differs from the saccharide compound S.

Any anionic emulsifier useful for cleaning purposes may be suitable. This may comprise salts (including, for example, sodium, potassium, ammonium, and substituted ammonium salts, such as mono-, di-, and triethanolamine salts) of anionic sulfate, sulfonate, carboxylate, succinate and sarcosinate emulsifiers or mixtures thereof.

Customary anionic emulsifiers are, for example, alkali metal salts and ammonium salts of alkyl sulfates (alkyl radical: $C_8$ to $C_{12}$), of sulfuric monoesters with ethoxylated alkanols (EO degree: 4 to 30, alkyl radical: $C_{12}$ to $C_{18}$) and with ethoxylated alkylphenols (EO degree: 3 to 50, alkyl radical: $C_4$ to $C_{12}$), of alkylsulfonic acids (alkyl radical: $C_{12}$ to $C_{18}$), and of alkylarylsulfonic acids (alkyl radical: $C_9$ to C18).

Other anionic emulsifiers which have proven suitable are, furthermore, compounds of the general formula (I)

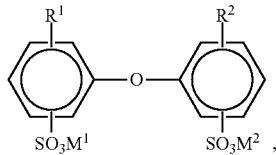

(I)

in which $R^1$ and $R^2$ are H atoms or $C_4$ to $C_{24}$ alkyl and are not simultaneously H atoms, and M1 and M2 may be alkali metal ions and/or ammonium ions. In the general formula (I), $R^1$ and $R^2$ are preferably linear or branched alkyl radicals having 6 to 18 C atoms, more particularly having 6, 12, and 16 C atoms, or hydrogen, with $R^1$ and $R^2$ not both simultaneously being H atoms. M1 and M2 are preferably sodium, potassium, or ammonium, with sodium being particularly preferred. Particularly advantageous compounds (I) are those in which M1 and M2 are sodium, $R^1$ is a branched alkyl radical having 12 C atoms, and $R^2$ is an H atom or $R^1$. Use is frequently made of technical mixtures which have a fraction of 50 to 90 wt % of the monoalkylated product, such as, for example, Dowfax® 2A1 (brand of the Dow Chemical Company). The compounds (I) are general knowledge, from US-A 4269749, for example, and available commercially.

Other suitable anionic emulsifiers include the isethionates, such as acyl isethionates, N-acyltaurates, fatty acid amides of methyl tauride, alkylsuccinates and sulfosuccinates, monoesters of sulfosuccinate (especially saturated and unsaturated $C_{12}$-$C_{18}$ monoesters), diesters of sulfosuccinate (especially saturated and unsaturated $C_6$-$C_{14}$ diesters), and N-acylsarcosinates. Further suitable anionic sulfate emulsifiers include the linear and branched, primary and secondary alkyl sulfates, fatty oleoyl glycerol sulfates, $C_5$-$C_{17}$-acyl N—($C_1$-$C_4$-alkyl)- and N—($C_1$-$C_2$-hydroxyalkyl)glucamine sulfates, and sulfates of alkylpolysaccharides, such as sulfates of alkylpolyglucoside.

Further suitable anionic sulfonate emulsifiers include the salts of linear $C_2$-$C_{22}$-alkylbenzenesulfonates, more particularly $C_3$-$C_{10}$-alkylbenzenesulfonates, alkyl ester sulfonates, primary or secondary $C_2$-$C_{22}$alkanesulfonates, more particularly $C_2$-$C_{10}$ alkanesulfonates, $C_6$-$C_{24}$ olefinsulfonates, sulfonated polycarboxylic acids, alkylglycerol sulfonates, fatty acyl glycerol sulfonates, fatty oleyl glycerol sulfonates, and any mixtures thereof.

Preference is given in the present invention to emulsifiers selected from alkyl sulfate and/or alkylbenzenesulfonate emulsifiers of the formulae II and III, respectively: $R^5OSO3$-$M^+$ (II) $R^6SO3$-$M^+$ (III), in which $R^5$ is a linear or branched alkyl or alkenyl unit having 2 to 22 carbon atoms, preferably $C_3$ to $C_{10}$ alkyl, or as is found analogously in secondary alkyl sulfates, $R^6$ is $C_2$-$C_{16}$ alkylbenzene, preferably $C_3$-$C_{10}$ alkylbenzene. $M^+$ and $M^+$ may vary independently and be selected from alkali metals, alkaline earth metals, alkanolammonium, and ammonium.

Very particular preference is given, in the chain growth addition polymer dispersion of the invention and/or in the formulation of the invention, to emulsifiers selected from the group consisting of sulfosuccinates, monoesters of sulfosuccinate, more particularly saturated and unsaturated $C_{12}$-$C_{18}$ monoesters, diesters of sulfosuccinate, more particularly saturated and unsaturated $C_8$-$C_{14}$ diesters, emulsifiers of the general formula (I)

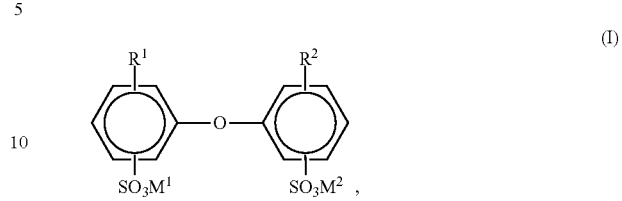

(I)

in which $R^1$ and $R^2$ are H atoms or $C_4$ to $C_{24}$ alkyl and are not simultaneously H atoms, and M1 and M2 may be alkali metal ions and/or ammonium ions, and to the salts of linear $C_3$-$C_{10}$ alkylbenzenesulfonates, primary or secondary $C_2$-$C_{10}$ alkanesulfonates.

Customary nonionic emulsifiers are, for example, ethoxylated mono-, di-, and tri-alkylphenols (EO degree: 3 to 50, alkyl radical: $C_4$ to $C_{12}$) and also ethoxylated fatty alcohols (EO degree: 3 to 80; alkyl radical: $C_8$ to $C_{36}$). Examples thereof are the Lutensol® A products ($C_{12}C_{14}$ fatty alcohol ethoxylates, EO degree: 3 to 8), Lutensol® AO products ($C_{13}C_{15}$ oxo-process alcohol ethoxylates, EO degree: 3 to 30), Lutensol® AT products ($C_{16}C_{18}$ fatty alcohol ethoxylates, EO degree: 11 to 80), Lutensol® ON products (C10 oxo-process alcohol ethoxylates, EO degree: 3 to 11), and the Lutensol® TO products ($C_{13}$ oxo-process alcohol ethoxylates, EO degree: 3 to 20) from BASF SE.

Suitable cation-active emulsifiers are generally the following salts with a $C_6$ to $C_{18}$ alkyl, $C_6$ to $C_{18}$ alkylaryl, or heterocyclic radical: primary, secondary, tertiary, or quaternary ammonium salts, alkanolammonium salts, pyridinium salts, imidazolinium salts, oxazolinium salts, morpholinium salts, thiazolinium salts, and also salts of amine oxides, quinolinium salts, isoquinolinium salts, tropylium salts, sulfonium salts, and phosphonium salts. Examples include dodecylammonium acetate or the corresponding sulfate, the sulfates or acetates of the various 2-(N,N,N-trimethylammonio)ethylparaffinic esters, N-cetylpyridinium sulfate, N-laurylpyridinium sulfate, and N-cetyl-N,N,N-trimethylammonium sulfate, N-dodecyl-N,N,N-trimethylammonium sulfate, N-octyl-N,N,N-trimethylammonium sulfate, N,N-distearyl-N,N-dimethylammonium sulfate, and the gemini surfactant N,N'-(lauryldimethyl)ethylenediamine disulfate, ethoxylated tal-lowalkyl-N-methylammonium sulfate, and ethoxylated oleylamine (for example, Uniperol® AC from BASF SE, about 11 ethylene oxide units). Numerous further examples are found in H. Stache, Tensid-Taschenbuch, Carl-Hanser-Verlag, Munich, Vienna, 1981 and in McCutcheon's, Emulsifiers & Detergents, MC Publishing Company, Glen Rock, 1989. It is useful if the anionic counter-groups are very non-nucleophilic, such as perchlorate, sulfate, phosphate, and nitrate, for example, and also carboxylates, such as acetate, trifluoroacetate, trichloroacetate, propionate, oxalate, citrate, and benzoate, for example, and also conjugate anions of organosulfonic acids, such as methylsulfonate, trifluoromethylsulfonate, and para-toluenesulfonate, for example, and additionally tetrafluoroborate, tetraphenylborate, tetrakis(pentafluorophenyl)borate, tetrakis[bis(3,5-trifluoromethyl)phenyl]borate, hexafluorophosphate, hexafluoroarsenate, or hexafluoroantimonate.

Preference is given to a chain growth addition polymer dispersion of the invention wherein the monomer B is acrylonitrile and/or methacrylonitrile.

Preference is given to a chain growth addition polymer dispersion of the invention wherein the polymer P has a glass transition temperature Tg of ≤−10° C. A particularly preferred polymer P has a glass transition temperature Tg of ≤−15° C.

Through skilful variations in nature and amount of the monomers it is possible in accordance with the invention for the skilled person to prepare polymer dispersions, more particularly chain growth addition polymers P, with polymers having a glass transition temperature within the desired range. Glass transition temperature Tg for the purposes of this specification means the midpoint temperature according to ASTM D 3418-82, as determined by differential scanning calorimetry (DSC) [cf. also Ullmann's Encyclopedia of Industrial Chemistry, page 169, Verlag Chemie, Weinheim, 1992, and Zosel in Farbe and Lack, 82, pages 125 to 134, 1976].

According to Fox (T. G. Fox, Bull. Am. Phys. Soc. 1956 [Ser. II] 1, page 123 and as per Ullmann's Encyclopädie der technischen Chemie, volume 19, page 18, 4$^{th}$ edition, Verlag Chemie, Weinheim, 1980), the glass transition temperature of copolymers with no more than low degrees of crosslinking is given to good approximation by:

$$1/Tg = x1/Tg1 + x2/Tg2 + \ldots xn/Tgn,$$

where x1, x2, ... xn are the mass fractions of the monomers 1, 2, ... n and Tg1, Tg2, ... Tgn are the glass transition temperatures in degrees Kelvin of the chain growth addition polymers constructed in each case only of one of the monomers 1, 2, ... n. The glass transition temperatures of these homopolymers of the majority of ethylenically unsaturated monomers are known (or are simple to determine experimentally in a conventional manner) and are listed for example in J. Brandrup, E. H. Immergut, Polymer Handbook 1st Ed. J. Wiley, New York, 1966, 2nd Ed. J. Wiley, New York, 1975 and 3rd Ed. J. Wiley, New York, 1989, and also in Ullmann's Encyclopedia of Industrial Chemistry, page 169, Verlag Chemie, Weinheim, 1992.

The chain growth addition polymers P, obtainable in particular by emulsion polymerization, may in principle have glass transition temperatures Tg in the range from ≥−70 to ≤−10° C., more particularly from ≥−70 to ≤−15° C.

Preference is given to a polymer dispersion of the invention comprising 45 to 400 wt % of solvent, based on the 100 wt % of polymer P. Particular preference is given to a polymer dispersion comprising 45 to 200 wt % of solvent, especially preferably 70 to 160 wt % of solvent, based on the 100 wt % of chain growth addition polymer P.

A preferred polymer dispersion of the invention is one where the saccharide compound S is selected from the group consisting of starch, cellulose, guaran, xanthan, alginate, pectin, chitosan, gum Arabic, gellan, or mixtures thereof.

Saccharide compound S used in the polymer dispersion of the invention is preferably a starch, a starch derivative and/or substitution products thereof.

In the polymer dispersion of the invention, the saccharide compound S preferably has a DE (dextrose equivalent) value in the range from 1 to 40, more preferably in the range from 16 to 34, and very preferably has a value of 16 to 20.

The DE value characterizes the reducing power (relative to the reducing power of anhydrous dextrose) and is determined as specified in DIN 10308, issue 5.71, prepared by the Technical Committee for Foodstuffs and Agricultural Products (cf. also Günther Teggel, Sträke and Strākederivate, Behr's Verlag Hamburg, 1984, p. 305).

Preference is given to the saccharide compound S in the polymer dispersion of the invention being maltodextrin. Maltodextrin may be a maltodextrin solution or may be spray-dried maltodextrin.

Further provided by the invention is a chain growth addition polymer powder obtainable by drying the polymer dispersion of the invention. Corresponding drying steps are known to the skilled person—by spray drying, for example.

In the polymer dispersion of the invention, the saccharide compound S is preferably a glucose syrup and/or a chemically modified degraded starch.

The maltodextrins preferred in the context of the present invention have DE values in the range from 3 to 20 and weight-average molecular weights of 15 000 to 30 000 g/mol. The glucose syrup likewise preferred for the purposes of the present invention has DE values of 20 to 30 and weight-average molecular weights in the range from 3000 to 9000 g/mol. Owing to the method used to prepare them, these products are obtained in the form of an aqueous solution and are therefore generally also marketed as such. Suitable solutions of maltodextrin have solids contents of 50 to 70 wt %; suitable solutions of glucose syrup have solids contents of 70 to 95 wt %. Maltodextrins in particular, however, are also available in spray-dried form as powder. Preference is given in accordance with the invention also to chemically modified degraded starches which have DE values of 1 to 3 and weight-average molecular weights $M_w$ of 100 000 to 1 000 000 g/mol, and which are commonly obtainable as a solid.

In the chain growth addition polymer dispersion of the invention there may preferably be further auxiliaries and/or additives. With preference ascorbic acid, sodium hydroxide, tert-butyl hydroperoxide, sodium acetonebisulfite, ammonia, defoamers and/or biocides may be present in the polymer dispersion, more particularly in the amounts familiar to the skilled person for aqueous polymer dispersions. The proportion of these components preferably does not exceed more than 5 wt %, based on the total weight of the polymer dispersion.

The present invention further provides a method for producing a chain growth addition polymer dispersion of the invention, comprising the steps of:

I.) providing at least one first phase comprising at least one chain growth addition polymer P constructed from 1 to 99.9 wt % of at least one ester from ethylenically unsaturated monomers, as monomer A, 0 to 20 wt % of at least one ethylenically unsaturated carbonitrile, as monomer B, 0.1 to 5 wt % of at least one acid-functional ethylenically unsaturated monomer, as monomer C, 0 to 5 wt % of at least one monomer which, alone or with a crosslinking agent, has crosslinking effect and which is different from the monomers A to C, as monomer D, 0 to 20 wt % of at least one ethylenically unsaturated monomer which has a chain growth addition homopolymer having a glass transition temperature 50° C. and which is different from the monomers A to D, as monomer E, the sum of the total amount of the monomers A to E making 100 wt %, a1) optionally at least one polymer seed, b) 10 to 60 parts by weight, based on 100 parts by weight of polymer P, of at least one saccharide compound S, and II.) providing a second phase comprising c) at least one solvent.

Preferred monomers, solvents, or saccharide compound S used have been given above.

Particular preference is given to a method for producing the chain growth addition polymer dispersion of the invention, comprising the steps of:

I.) providing at least one first phase comprising at least one chain growth addition polymer P constructed from 1 to 92.8 wt % of at least one ester from ethylenically unsaturated monomers, as monomer A, 7 to 20 wt % of at least one ethylenically unsaturated carbonitrile, as monomer B, 0.1 to 5 wt % of at least one acid-functional ethylenically unsaturated monomer, as monomer C, 0 to 5 wt % of at least one monomer which, alone or with a crosslinking agent, has crosslinking effect and which is different from the monomers A to C, as monomer D, 0.1 to 20 wt % of at least one ethylenically unsaturated monomer which has a chain growth addition homopolymer having a glass transition temperature 50° C. and which is different from the monomers A to D, as monomer E, the sum of the total amount of the monomers A to E making 100 wt %, a1) optionally at least one polymer seed, b) 10 to 60 parts by weight, based on 100 parts by weight of polymer P, of at least one saccharide compound S, and II.) providing a second phase comprising c) at least one solvent.

The provision of the first and second phases comprises the formation of a dispersion.

For the preparation of the chain growth addition polymer P in the form of its aqueous polymer dispersion, the total amount of the monomers A to E may be included as an initial charge in the aqueous reaction medium before the polymerization reaction is initiated.

An alternative possibility is to include, optionally, only a portion of the monomers A to E and, optionally, the polymer seed in the initial charge in the aqueous reaction medium before the polymerization reaction is initiated, and then, following initiation of the polymerization, under polymerization conditions, to add the total amount or, where appropriate, the remainder during the radical emulsion polymerization in accordance with the rate of consumption, the addition taking place continuously, with constant or changing volume flow rates, or discontinuously (semi-batch process). In this case the monomers A to E may be metered in the form of separate, individual streams, as inhomogeneous or homogeneous (partial) mixtures, or as one or more monomer emulsions, simultaneously or sequentially. With advantage, the monomers A to E are metered in the form of a monomer mixture, more particularly in the form of an aqueous monomer emulsion.

For the preparation of the polymers P used in accordance with the invention, in the form of their aqueous polymer dispersion, dispersing assistants may also be used, these dispersants keeping not only the monomer droplets but also the resultant polymer particles in disperse distribution in the aqueous medium and hence ensuring the stability of the aqueous polymer dispersion produced. Dispersing assistants contemplated include not only the protective colloids that are commonly used for conducting radical aqueous emulsion polymerizations, but also emulsifiers. Suitable emulsifiers have already been identified above.

Examples of suitable protective colloids are polyvinyl alcohols, polyalkylene glycols, alkali metal salts of polyacrylic acids and polymethacrylic acids, gelatin deratives, or acrylic acid, methacrylic acid, maleic anhydride, 2-acrylamido-2-methylpropanesulfonic acid and/or 4-styrenesulfonic acid copolymers and their alkali metal salts, but also homopolymers and copolymers of N-vinylpyrrolidone, N-vinylcaprolactam, N-vinylcarbazole, 1-vinylimidazole, 2-vinylimidazole, 2-vinylpyridine, 4-vinylpyridine, acrylamide, methacrylamide, amino-bearing acrylates, methacrylates, acrylamides and/or methacrylamides. A comprehensive description of further suitable protective colloids is found in Houben-Weyl, Methoden der organischen Chemie, volume XIV/1, Makromolekulare Stoffe [Macromolecular compounds], Georg-Thieme-Verlag, Stuttgart, 1961, pages 411 to 420.

It will be appreciated that mixtures of protective colloids and/or emulsifiers may also be used. Use is frequently made as dispersants exclusively of emulsifiers, whose relative molecular weights contrast with those of the protective colloids in being usually below 1000. They may be anionic, cationic, or nonionic in nature. Where mixtures of surface-active substances are used, the individual components must of course be compatible with one another, something which in case of doubt can be verified by means of a few preliminary tests. Generally speaking, anionic emulsifiers are compatible with one another and with nonionic emulsifiers. The same is true of cationic emulsifiers, whereas anionic and cationic emulsifiers are usually not compatible with each other. An overview of suitable emulsifiers is found in Houben-Weyl, Methoden der organischen Chemie, volume XIV/1, Makromolekulare Stoffe [Macromolecular compounds], Georg-Thieme-Verlag, Stuttgart, 1961, pages 192 to 208.

With preference, however, emulsifiers are used as dispersing assistants.

The emulsifiers used with preference as dispersing assistants are employed advantageously in a total amount $\geq 0.005$ and $\leq 10$ wt %, preferably $\geq 0.01$ and $\leq 5$ wt %, more particularly $\geq 0.5$ and $\leq 4$ wt %, based in each case on the total amount of the monomers A to E (total monomer amount).

The total amount of the protective colloids used as dispersing assistants instead of or in addition to the emulsifiers is often $\geq 10.005$ and $\leq 70$ wt % and frequently $\geq 10.01$ and $\leq 65$ wt %, based in each case on the total amount of monomers A to E. The total amount of the protective colloids, in the sense of the present invention, means the sum total of the saccharide compound S and of any protective colloid used that is different from the saccharide compound S, but not the aforementioned emulsifiers that are different therefrom.

In order to prepare the inventively employed chain growth addition polymers P in the form of their aqueous polymer dispersion, the entire amount of the dispersing assistant may be included in the initial charge in the aqueous reaction medium before the polymerization reaction is initiated. An alternative option is to include, optionally, only a portion of the dispersing assistant in the aqueous reaction medium in the initial charge before the polymerization reaction is initiated, and then to add the total amount or any remainder of the dispersing assistant, continuously or discontinuously, under polymerization conditions, during the radical emulsion polymerization. It is likewise possible for the total amount or a portion of the dispersing assistant to be added after the end of the polymerization. The main amount or the total amount of dispersing assistant is preferably added in the form of an aqueous monomer emulsion.

The radically initiated aqueous emulsion polymerization is triggered by means of a radical polymerization initiator (or radical initiator). This may in principle encompass both peroxides and azo compounds. Of course, redox initiator systems are also contemplated. Peroxides which can be used include in principle inorganic peroxides, such as hydrogen peroxide or peroxodisulfates, such as the mono- or di-alkali metal salts or ammonium salts of peroxodisulfuric acid, such as, for example, its mono- and di-sodium, -potassium, or ammonium salts, or organic peroxides, such as alkyl hydroperoxides, as for example tert-butyl, p-menthyl, or cumyl hydroperoxide, and also dialkyl or dialkyl peroxides, such as di-tert-butyl or dicumyl peroxide. Finding use as azo compound are essentially 2,2'-azobis(isobutyronitrile), 2,2'-azobis(2,4-dimethylvaleronitrile), and 2,2'-azobis(amidinopropyl) dihydrochloride (AIBA, corresponding to V-50 from Wako Chemicals). Oxidizing agents contemplated for redox initiator systems are essentially the abovementioned peroxides. As corresponding reducing agents it is possible to use sulfur compounds with a low oxidation state, such as alkali metal sulfites, as for example potassium and/or sodium sulfite, alkali metal hydrogensulfites, as for example potassium and/or sodium hydrogensulfite, alkali metal metabisulfites, as for example potassium and/or sodium metabisulfite, formaldehyde-sulfoxylates, as for example potassium and/or sodium formaldehyde-sulfoxylate, alkali metal salts, especially potassium and/or sodium salts, of aliphatic sulfinic acids, and alkali metal hydrogensulfides, such as potassium and/or sodium hydrogensulfide, for example, salts of polyvalent metals, such as iron(II) sulfate, iron(II) ammonium sulfate, iron(II) phosphate, enediols, such as dihydroxymaleic acid, benzoin and/or ascorbic acid, and also reducing saccharides, such as sorbose, glucose, fructose and/or dihydroxyacetone. In general the amount of radical initiator used, based on the total monomer amount, is 0.01 to 5 wt %, preferably 0.1 to 3 wt %, and especially preferably 0.2 to 1.5 wt %.

In order to prepare the inventively employed chain growth addition polymers P in the form of their aqueous polymer dispersion, the entire amount of the radical initiator may be included in the initial charge in the aqueous reaction medium before the polymerization reaction is initiated. An alternative option is to include, optionally, only a portion of the radical initiator in the aqueous reaction medium in the initial charge before the polymerization reaction is initiated, and then to add the total amount or any remainder of the radical initiator according to the rate of consumption thereof, continuously or discontinuously, under polymerization conditions, during the radical emulsion polymerization.

Initiation of the polymerization reaction means the start of the polymerization reaction of the monomers present in the polymerization vessel, following formation of radicals by the radical initiator. This initiation of the polymerization reaction may take place by addition of radical initiator to the aqueous polymerization mixture in the polymerization vessel under polymerization conditions. An alternative option is to add a portion or the entirety of the radical initiator to the aqueous polymerization mixture, comprising the monomers included in the initial charge, in the polymerization vessel, under conditions not apt to trigger a polymerization reaction—at low temperature, for example—and subsequently to bring about polymerization conditions within the aqueous polymerization mixture. Polymerization conditions are, in general, the temperatures and pressures under which the radically initiated aqueous emulsion polymerization proceeds at a sufficient polymerization rate. They are dependent in particular on the radical initiator used. With advantage, the nature and amount of the radical initiator, the polymerization temperature, and the polymerization pressure are selected such that the radical initiator exhibits a half-life <3 hours, especially advantageously <1 hour, and with very particular advantage <30 minutes, there being always sufficient initiating radicals available here to initiate and maintain the polymerization reaction.

Reaction temperatures contemplated for the radical aqueous emulsion polymerization span the whole range from 0 to 170° C. Generally speaking, temperatures of 50 to 120° C. are employed, preferably 60 to 110° C., and especially preferably 70 to 100° C. The radical aqueous emulsion polymerization may be carried out under a pressure less than, equal to or greater than 1 atm [1.013 bar (absolute) atmospheric pressure], and consequently the polymerization temperature may exceed 100° C. and can be up to 170° C. Where monomers A to E with a low boiling point are present, the emulsion polymerization is preferably conducted under elevated pressure. In that case the pressure may assume levels of 1.2, 1.5, 2, 5, 10 or 15 bar (absolute) or even higher. If the emulsion polymerization is carried out under subatmospheric pressure, pressure of 950 mbar, frequently of 900 mbar, and often 850 mbar (absolute) are set. The radical aqueous emulsion polymerization is conducted advantageously at 1 atm in the absence of oxygen, more particularly under an inert gas atmosphere, such as under nitrogen or argon, for example.

Chain transfer agents may be used in the method of the invention. By means of such agents, through a chain termination reaction, the molar mass of the (emulsion) polymer can be reduced. These agents become bonded to the polymer, generally to the chain end.

The amount of the chain transfer agents is preferably 0.01 to 4 parts by weight, more preferably 0.05 to 2 parts by weight, based on 100 parts by weight of the chain growth addition polymer P. Examples of suitable such agents include compounds with a thiol group, such as tert-butyl mercaptan, thioglycolic acid alkyl esters, mercaptoethanol, mercaptopropionic acid, 2-ethylhexyl thioglycolate, mercaptopropyltrimethoxysilane, and n-dodecyl or tert-dodecyl mercaptan. The agents are generally low molecular mass compounds with a molar weight <2000, more particularly <1000 g/mol.

Particularly preferred as chain transfer agents are 2-ethylhexyl thioglycolate and/or tert-dodecyl mercaptan.

The radically initiated aqueous emulsion polymerization may also be carried out in the presence of a polymer seed, as for example in the presence of 0.01 to 3 parts by weight, preferably of 0.02 to 2 parts by weight and very preferably of 0.02 to 1.0 part by weight of a polymer seed, based in each case on 100 parts by weight of chain growth addition polymer P.

A polymer seed is used in particular when the particle size of the polymer particles to be prepared by means of a radical aqueous emulsion polymerization is to be customized (in this regard, see, for example, US-A 2520959 and US-A 3397165).

Use is made more particularly of a polymer seed whose particles have a narrow size distribution and have weight-average diameters Dw≤100 nm, frequently ≥5 nm to ≤50 nm, and often ≥15 nm to ≤35 nm. Determining the weight-average particle diameter is familiar to the skilled person and is accomplished, for example, using the method of the analytical ultracentrifuge. Weight-average particle diameter in this specification means the weight-average Dw50 value determined by the analytical ultracentrifuge method (in this regard, cf. S. E. Harding et al., Analytical Ultracentrifugation in Biochemistry and Polymer Science, Royal Society of Chemistry, Cambridge, Great Britain 1992, Chapter 10, Analysis of Polymer Dispersions with an Eight-Cell AUC Multiplexer: High Resolution Particle Size Distribution and Density Gradient Techniques, W. Mächtle, pages 147 to 175).

Narrow particle size distribution is intended for the purposes of the present specification to mean when the ratio of the weight-average particle diameter Dw50 to the number-average particle diameter DN50 [Dw50/DN50], determined by the analytical ultracentrifuge method, is <2.0, preferably <1.5, and especially preferably <1.2 or <1.1.

The polymer seed is used typically in the form of an aqueous dispersion of chain growth addition polymer. The aforementioned quantity figures relate to the polymer solids fraction of the aqueous polymer seed dispersion.

If a polymer seed is used, an exogenous polymer seed is advantageously used. In contrast to what is known as an in-situ polymer seed, which is produced before the start of the actual emulsion polymerization in the reaction vessel and which generally has the same monomeric composition as the chain growth addition polymer produced by the subsequent radically initiated aqueous emulsion polymerization, an exogenous polymer seed means a polymer seed which has been produced in a separate reaction step and whose monomeric composition differs from the chain growth addition polymer prepared by the radically initiated aqueous emulsion polymerization, although this means nothing more than that different monomers, or monomer mixtures with a different composition, are used for preparing the exogenous polymer seed and for preparing the aqueous polymer dispersion. Preparing an exogenous polymer seed is familiar to the skilled person and is typically accomplished by the introduction as initial charge to a reaction vessel of a relatively small amount of monomers and also a relatively large amount of emulsifiers, and by the addition at reaction temperature of a sufficient amount of polymerization initiator.

Inventively preferred is the use of an exogenous polymer seed having a glass transition temperature 50° C., frequently 60° C. or 70° C., and often 80° C. or 90° C. Especially preferred is a polystyrene or a polymethyl methacrylate polymer seed.

The total amount of exogenous polymer seed can be included in the initial charge to the polymerization vessel. It is, however, also possible to include only a portion of the exogenous polymer seed in the initial charge to the polymerization vessel, and to add the remainder during the polymerization vessel together with the monomers A to E. As well, however, if necessary, the entire amount of polymer seed may be added in the course of the polymerization, continuously or as a single shot. The total amount of exogenous polymer seed is preferably included in the initial charge to the polymerization vessel before the polymerization reaction is initiated.

The arithmetic mean particle size, determined by hydrodynamic fractionation, of the latex particles consisting of the chain growth addition polymer P, the saccharide compound S, and optionally the polymer seed is preferably in a range from ≥180 nm to ≤800 nm, more preferably from ≥250 nm to ≤700 nm. The particle sizes were determined by means of hydrodynamic fractionation with a Polymer Labs PSDA (Particle Size Distribution Analyser). The Cartridge PL0850-1020 column type used was operated with a flow rate of 2 ml min$^{-1}$. The samples were diluted with the eluent solution down to an absorption of 0.03 AU·μl$^{-1}$. The sample is eluted by the size exclusion principle according to the hydrodynamic diameter. The eluent comprises 0.2 wt % of dodecyl poly(ethylene glycol ether)$_{23}$, 0.05 wt % of sodium dodecylsulfonate, 0.02 wt % of sodium dihydrogenphosphate, and 0.02 wt % of sodium azide in deionized water. The pH is 5.8. The elution time is calibrated with PS calibration latices. Measurement takes place in the 20 nm to 1200 nm range. Detection is by a UV detector at a wavelength of 254 nm.

The present invention additionally provides an aqueous formulation for adhesive bonding, comprising i) the chain growth addition polymer dispersion of the invention, or the chain growth addition polymer powder of the invention obtainable therefrom by drying as binder, said formulation having a solids content originating from said polymer dispersion or from said polymer powder of 5 to 90 wt %, more particularly 10 to 30 wt %, based on the total solids content of the formulation. The solids content describes the proportion of nonvolatile fractions. The solids content of a dispersion is determined by means of a balance with infrared moisture analysis. In this determination, a quantity of polymer dispersion is introduced into the instrument, heated to 140° C. and subsequently held at that temperature. As soon as the average decrease in weight falls below 1 mg within 140 seconds, the measurement procedure is ended. The ratio of weight after drying to original mass introduced gives the solids content of the polymer dispersion. The total solids content of the formulation is determined arithmetically from the amounts of the substances added and from their solids contents and concentrations.

The formulation for adhesive bonding is suitable, for example, as an adhesive for joining two substrates to one another, for example. The formulation has preferential suitability as a flooring adhesive.

The formulation of the invention for adhesive bonding comprises the polymer dispersion of the invention and may consist solely of this dispersion. Besides the polymer dispersion, however, the formulation may also comprise further additions of the kind customary in adhesives based on aqueous polymer dispersions. These include fillers, colorants, including pigments, thickeners, biocides, and optionally further auxiliaries. Examples of further additives suitable for the adhesive bonding formulation include tackifiers (tackifying resins).

The formulation of the invention preferably further comprises ii) at least one filler.

The formulation of the invention comprises 25 to 50 wt % of at least one filler, based on the total amount of the formulation, preferably 35 to 45 wt % of at least one filler, based on the total amount of the formulation.

Suitable fillers are, for example, aluminosilicates, such as feldspars, silicates, such as kaolin, talc, mica, magnesite, alkaline earth metal carbonates, such as calcium carbonate, in the form of calcite or chalk, for example, magnesium carbonate, dolomite, alkaline earth metal sulfates, such as calcium sulfate, silicon dioxide, etc. In dispersions, finely divided fillers are of course preferred. The fillers may be used as individual components. In practice, however, filler mixtures have been found particularly appropriate, examples being calcium carbonate/kaolin and calcium carbonate/talc.

Calcium carbonate is used with particular preference as a filler.

The filler in the formulation of the invention is preferably calcium carbonate with an average particle diameter of 2 to 50 μm or a finely ground quartz having an average particle diameter of 3 to 50 μm, or a combination of the two substances. The average particle diameter may be determined by means of light scattering techniques, for example. Examples of calcium carbonate are chalk, limestone, or calcite marble.

The formulation of the invention preferably further comprises iii) at least one tackifier.

Suitable tackifiers are, for example, natural resins, such as rosins and derivatives produced therefrom by disproportionation, isomerization, polymerization, dimerization, or hydrogenation. They may be present in their salt form (with monovalent or polyvalent counterions, for example) or, preferably, in their esterified form. Alcohols used for the esterification may be mono- or poly-hydric.

Also used as tackifiers are hydrocarbon rosins, examples being indene-coumarone resins, polyterpene resins, hydrocarbon resins based on unsaturated CH compounds, such as butadiene, pentene, methylbutene, isoprene, piperylene, divinylmethane, pentadiene, cyclopentene, cyclopentadiene, cyclohexadiene, styrene, α-methylstyrene, and vinyltoluene.

Also possible for use as tackifiers are polyacrylates which have a low molar weight. These polyacrylates preferably have a weight-average molecular weight Mw of below 30 000 g/mol. The polyacrylates consist of C1-C10 alkyl (meth) acrylates to an extent preferably of at least 60 wt %, more particularly of at least 80 wt %. Likewise preferred tackifiers are polyalkylene glycols.

Preferred tackifiers are natural or chemically modified rosins or combinations thereof. Rosins consist predominantly of abietic acid or derivatives of abietic acid. Particularly preferred are combinations of natural rosins with chemically modified rosins and polyalkylene glycols. The amount by weight of the tackifiers is preferably 0 to 50 wt %, more preferably 0 to 40 wt %, more particularly 5 to 30 wt %, based on the total solids content of the formulation.

The formulation of the invention preferably comprises
i) 20 to 55 wt % of the chain growth addition polymer dispersion,
ii) 25 to 50 wt % of at least one filler,
iii) 5 to 30 wt % of at least one tackifier,
iv) 0.1 to 3 wt % of at least one emulsifier,
v) 0.05 to 0.4 wt % of at least one defoamer,
vi) 0.1 to 2 wt % of at least one pigment disperser,
vii) 0.001 to 1 wt % of at least one thickener, and
viii) 0.1 to 0.8 wt % of at least one wetting agent,
the sum of the total amount of i) to viii) being 100 wt %.

Preferred emulsifiers and dispersants have been stated above. Suitable defoamers are based, for example, on modified alcohols and polysiloxane adducts. Suitable wetting agents are based, for example, on ethoxylated fatty acids.

Examples of preferred defoamers are mineral oil and silicone oil defoamers and oxyalkylated compounds, such as Agitan® 282, Agitan® E255, Byk® 93, FoamStar PB 2706, or FoamStar SI 2210, for example.

Preferred pigment dispersers are, for example, polymers based on carboxylic acids, such as, for example, Dispex AA 4135, Dispex CX 4320, Dispex AA 4140, or Dispex AA 4040. Preferred thickeners are based, for example, on anionic polyacrylate copolymers (such as Rheovis AS 1125, for example), on polyurethanes (such as Rheovis PU 1190, for example), or on cellulose derivatives.

Preferred wetting agents are based, for example, on ethoxylated fatty acids such as, for example, Hydropalat WE 3185, or on sodium salts of sulfosuccinates, such as Hydropalat WE 3450, for example.

Additionally provided by the present invention is the use of the formulation of the invention as an adhesive, more preferably as a flooring adhesive. Flooring adhesives based on emulsion polymers are known, especially those based on acrylate latices.

The adhesive formulation used in accordance with the invention exhibits very good adhesive properties, including in particular effective adhesion to the substrates to be bonded and a high level of cohesion (internal strength within the layer of adhesive). The formulation, moreover, is simple to handle and has good processing properties. In terms of the bonding of flexible floor-coverings, it is superior to prior-art adhesives through significantly increased values for dry grip in conjunction with further properties that remain good, particularly the wet grab.

The flooring adhesive used in accordance with the invention preferably has a wet grab in a range from 5 to 10 N/5 cm (peel resistance, with adhesive coatweight of 300-350 g/m$^2$) and a dry grip in a range from 20 to 30 N/5 cm (peel resistance, with adhesive coatweight of 280-320 g/m$^2$).

All embodiments and preferred embodiments set out above are freely combinable with one another, unless the context clearly rules out such combination.

The invention is elucidated in more detail by the examples hereinafter.

TABLE 1

Assignment of dispersions to formulations

| Dispersion from: | Constituent of the formulation: |
|---|---|
| Comparative dispersion 1 | Comparative formulations 1a, 1b, 1c, 1d, 1e |
| Example 1 | Formulation 1 |
| Example 2 | Formulation 2 |
| Example 3 | Formulation 3 |
| Example 4 | Formulation 4 |
| Comparative example 2 | Comparative formulation 2 |
| Comparative example 3 | Comparative formulation 3 |
| Comparative example 4 | Comparative formulation 4 |
| Comparative example 5 | Comparative formulation 5 |
| Comparative example 6 | Comparative formulation 6 |

EXAMPLE 1

A glass reactor equipped with a stirrer, metering facilities, temperature sensor, and reflux condenser was charged at room temperature with a mixture of 386.54 g of water, 6.15 g of a 9.1 wt % strength aqueous solution of L(+)-ascorbic acid, 0.85 g of a 33 wt % aqueous polystyrene seed dispersion (average particle diameter 32 nm), and 297.71 g of a maltodextrin (DE value 16.5-19.9), and this initial charge was flushed with nitrogen and heated to 85° C. with stirring. When the temperature was reached, 10% of feed 1 was added to the reactor over the course of 2 minutes, and was incorporated by stirring at this temperature for 3 minutes. Then the remainder of feed 1, and also feed 2, were commenced simultaneously and added in the following way, with the aforementioned temperature maintained: a) feed 1: 59.6% of the remaining feed 1 was added over 2 h 15 min, after which the remainder of feed 1 (40.4%) was added over 1 h. b) Feed 2 was added using the following metering profile: successive feed of 1.16% in 7 min, 2.31% in 8 min, 3.47% in 7 min, 4.62% in 8 min, 78.73% in 2 h 17 min, 1.5% in 3 min, 0.75% in 2 min and 7.46% in 23 min.

Feed 1: 40 g of 7 wt % strength aqueous solution of sodium persulfate
Feed 2: 125.77 g of water
  105.00 g of 20 wt % strength aqueous solution of sodium dodecylbenzylsulfonate
  17.50 g of acrylic acid (AA)
  0.35 g of 2-ethylhexyl thioglycolate
  70.00 g of 2-ethylhexyl acrylate (EHA)
  70.00 g of acrylonitrile (AN)
  542.50 g of n-butyl acrylate (nBA)

Then 13.09 g of water were added to the reactor and the reaction mixture was stirred at 85° C. for 30 minutes, followed by addition of a further 19.67 g of water. For chemical deodorization, the following two mixtures were added in the form of two separate feeds with a constant feed rate over 2 hours: a) 29.40 g of a 10% strength aqueous solution of tert-butyl hydroperoxide, b) 28.32 g of a 13.1% strength solution of sodium acetone bisulfite and 1.47 g of water. After 30 minutes the temperature was lowered continuously to 70° C. over the course of 15 minutes, and was then maintained at that temperature, with a gentle stream of nitrogen being passed through the apparatus and through an attached cold trap containing dry ice. Then 21.00 g of a 10% strength aqueous ammonia solution were added over the course of 30 minutes, followed by addition of 95.47 g of water. The dispersion was cooled to room temperature, biocides were added, and it was filtered.

The dispersion obtained in the example has a solids content of 53% with a pH of 6.6. The LT is 70 [the average particle diameter is determined by the method of quasi-elastic light scattering (ISO standard 13 321)] and the viscosity is 164 mPas (measured at 500 revolutions per second).

Comparative Dispersion 1

A glass reactor equipped with a stirrer, metering facilities, temperature sensor, and reflux condenser was charged at room temperature with a mixture of 226.07 g of water, 9.23 g of a 9.1 wt % strength aqueous solution of L(+)-ascorbic acid, and 1.27 g of a 33 wt % aqueous polystyrene seed dispersion (average particle diameter 32 nm), and this initial charge was flushed with nitrogen and heated to 85° C. with stirring. When the temperature was reached, 10% of feed 1 was added to the reactor over the course of 2 minutes, and was incorporated by stirring at this temperature for 3 minutes. Then the remainder of feed 1, and also feed 2, were commenced simultaneously and added in the following way, with the aforementioned temperature maintained: a) feed 1: 59.6% of the remaining feed 1 was added over 2 h 15 min, after which the remainder of feed 1 (40.4%) was added over 1 h. b) Feed 2 was added using the following metering profile: successive feed of 1.16% in 7 min, 2.31% in 8 min, 3.47% in 7 min, 4.62% in 8 min, 78.73% in 2 h 17 min, 1.5% in 3 min, 0.75% in 2 min and 7.46% in 23 min.

Feed 1: 85.50 g of 7 wt % strength aqueous solution of sodium persulfate

Feed 2: 219.83 g of water
- 114.84 g of 32 wt % strength aqueous solution of Emulphor FAS 30
- 26.25 g of 20 wt % strength aqueous solution of Lutensol AT 18
- 26.25 g of acrylic acid (AA)
- 20.16 g of 25 wt % strength aqueous sodium hydroxide solution
- 105.00 g of acrylonitrile (AN)
- 918.75 g of n-butyl acrylate (nBA)

Then 19.64 g of water were added to the reactor and the reaction mixture was stirred at 85° C. for 30 minutes, followed by addition of a further 29.51 g of water. For chemical deodorization, the following two mixtures were added in the form of two separate feeds with a constant feed rate over 2 hours: a) 40.95 g of a 10% strength aqueous solution of tert-butyl hydroperoxide, b) 39.60 g of a 13.1% strength solution of sodium acetone bisulfite and 2.00 g of water. After 30 minutes the temperature was lowered continuously to 70° C. over the course of 15 minutes, and then maintained at that temperature. Then 23.10 g of a 10% strength aqueous ammonia solution were added over the course of 30 minutes, followed by addition of 113.06 g of water. The dispersion was cooled to room temperature, biocides were added, and it was filtered.

The dispersion obtained in the example has a solids content of 55.7% with a pH of 7.1. The LT is 54 [the average particle diameter is determined by the method of quasi-elastic light scattering (ISO standard 13 321)] and the viscosity is 66 mPas (measured at 500 revolutions per second).

Formulation for Example 1

Formulation 1 is prepared from the polymer dispersion prepared in example 1, and further components. Comparative dispersion 1 is formulated in exactly the same way, to give comparative formulation 1a. Formulation 1 and comparative formulation 1a are prepared as follows:

With stirring, and at 23° C., the 27.3 parts by weight of dispersion are admixed with 8.6 parts by weight of Rheovis AS 1125 (thickener, in the form of a 3% strength solution). Then 19 parts by weight of a hot resin mixture (tackifier; mixture consisting of 50 wt % Dercol M10, 50 wt % Bremasin 1601; heated to 95° C. prior to the addition) are added with stirring over the course of 15 minutes, followed by stirring for 10 minutes more. 0.5 part by weight of Emulphor FAS30 (emulsifier), 0.2 part by weight of Foam-Star SI 2210 (defoamer), 1 part by weight of Dispex AA4135 (pigment disperser), and 0.4 part by weight of Hydropalat WE 3185 (wetting agent) are added in succession with stirring. Then 43 parts by weight of Omyacarb 10 GU (filler) are mixed in with stirring, followed by stirring for 10 minutes more.

Determination of the Wet Grab:

The formulation is applied as an adhesive with serrated strip TKB B 1 to fiber cement slabs (e.g., Eternit® 2000, 500×200 mm) in peel direction. The amount applied is about 300-350 g/m². NFC (Finett 11 needlefelt floorcovering) strips (150×50×5.2 mm) are laid into the bed of adhesive after venting for 10 minutes, and are pressed down with a 2.5 kg roller by rolling back and forth three times. At time intervals (10, 20, 30, and 40 minutes), the coverings are peeled off with a peeling device, and the increase in the peel resistance (in N/5 cm) is ascertained.

Determination of the Dry Grip:

The formulation is applied as an adhesive with serrated strip TKB A2 to fiber cement slabs (e.g., Eternit® 2000, 500×200 mm) in peel direction. The amount applied is about 280-320 g/m². PVC strips (Tarkett standard 2 mm; 150× 50×2 mm) are laid into the bed of adhesive after different venting times (30, 40, 50, and 60 minutes), and are pressed down with a 2.5 kg roller by rolling back and forth three times. Subsequently the strips are peeled off with a peel instrument, and the increase in the peel resistance (in N/5 cm) is ascertained.

Table 2 below contrasts the inventive formulation and the comparative formulation. As is evident from table 2, inventive formulation 1 has an improved dry grip and retained wet grab relative to the comparative formulation 1a.

TABLE 2

| Test | Testing after | Venting time | Comparative formulation 1a (in N/5 cm) | Formulation 1 (in N/5 cm) |
|---|---|---|---|---|
| Wet grab | 10 min | 10 min | 3 | 5 |
|  | 20 min | 10 min | 3 | 10 |
|  | 30 min | 10 min | 5 | 8 |
|  | 40 min | 10 min | 11 | 10 |

TABLE 2-continued

| Test | Testing after | Venting time | Comparative formulation 1a (in N/5 cm) | Formulation 1 (in N/5 cm) |
|---|---|---|---|---|
| Dry grip | 30 min | 30 min | 8 | 20 |
|  | 40 min | 40 min | 16 | 30 |
|  | 50 min | 50 min | 19 | 30 |
|  | 60 min | 60 min | 13 | 30 |

Example 2

A glass reactor equipped with a stirrer, metering facilities, temperature sensor, and reflux condenser was charged at room temperature with a mixture of 71.35 g of water, 4.95 g of a 9.1 wt % strength aqueous solution of L(+)-ascorbic acid, 0.68 g of a 33 wt % aqueous polystyrene seed dispersion (average particle diameter 32 nm), and 478.46 g of a 50 wt % strength aqueous maltodextrin solution (DE value 16.5-19.9), and this initial charge was flushed with nitrogen and heated to 85° C. with stirring. When the temperature was reached, 10% of feed 1 was added to the reactor over the course of 2 minutes, and was incorporated by stirring at this temperature for 3 minutes. Then the remainder of feed 1, and also feed 2, were commenced simultaneously and added in the following way, with the aforementioned temperature maintained: a) feed 1: 59.6% of the remaining feed 1 was added over 2 h 15 min, after which the remainder of feed 1 (40.4%) was added over 1 h. b) Feed 2 was added using the following metering profile: successive feed of 1.16% in 7 min, 2.31% in 8 min, 3.47% in 7 min, 4.62% in 8 min, 78.73% in 2 h 17 min, 1.5% in 3 min, 0.75% in 2 min and 7.46% in 23 min.

Feed 1: 45.80 g of 7 wt % strength aqueous solution of sodium persulfate
Feed 2: 117.78 g of water
61.52 g of 32 wt % strength aqueous solution of Emulphor FAS 30
14.06 g of 20 wt % strength aqueous solution of Lutensol AT 18
14.06 g of acrylic acid (AA)
0.51 g of tert-dodecyl mercaptan
10.80 g of 25 wt % strength aqueous solution of sodium hydroxide
56.25 g of acrylonitrile (AN)
491.68 g of n-butyl acrylate (nBA)

Then 10.52 g of water were added to the reactor and the reaction mixture was stirred at 85° C. for 30 minutes, followed by addition of a further 15.81 g of water. For chemical deodorization, the following two mixtures were added in the form of two separate feeds with a constant feed rate over 2 hours: a) 23.63 g of a 10% strength aqueous solution of tert-butyl hydroperoxide, b) 22.76 g of a 13.1% strength solution of sodium acetone bisulfite and 1.18 g of water. After 30 minutes the temperature was lowered continuously to 70° C. over the course of 15 minutes, and was then maintained at that temperature, with a gentle stream of nitrogen being passed through the apparatus and through an attached cold trap containing dry ice. Then 12.38 g of a 10% strength aqueous ammonia solution were added over the course of 30 minutes, followed by addition of 64.80 g of water. The dispersion was cooled to room temperature, biocides were added, and it was filtered. The dispersion had a solids content of 54.5 wt %, based on the total weight of the aqueous dispersion.

Formulation for Example 2

Formulation 2 is prepared from the polymer dispersion prepared in example 2, and further components. Comparative dispersion 1 is formulated in exactly the same way, to give comparative formulation 1b. Formulation 2 and comparative formulation 1b are prepared as follows:

With stirring, and at 23° C., the 40 parts by weight of dispersion are admixed with 5.5 parts by weight of Rheovis AS 1125 (thickener; for formulation 2 in the form of an 8% strength solution, for comparative formulation 1b in the form of a 6% strength solution). Then 15 parts by weight of a hot resin mixture (tackifier; mixture consisting of 45 wt % Dercol M10, 45 wt % Bremasin 1601, and 10 wt % Pluriol P600; heated to 95° C. prior to the addition) are added with stirring over the course of 15 minutes, followed by stirring for 10 minutes more. 1 part by weight of Emulphor FAS30 (emulsifier), 0.2 part by weight of FoamStar SI 2210 (defoamer), 1 part by weight of Dispex AA4135 (pigment disperser), and 0.2 part by weight of Hydropalat WE 3185 (wetting agent) are added in succession with stirring. Then 37.1 parts by weight of Omyacarb 10 GU (filler) are mixed in with stirring, followed by stirring for 10 minutes more.

Determination of the Wet Grab:

The formulation is applied as an adhesive with serrated strip TKB B 1 to fiber cement slabs (e.g., Eternit® 2000, 500×200 mm) in peel direction. The amount applied is about 300-350 g/m². NFC (Finett 11 needlefelt floorcovering) strips (150×50×5.2 mm) are laid into the bed of adhesive after venting for 10 minutes, and are pressed down with a 2.5 kg roller by rolling back and forth three times. At time intervals (10, 20, 30, and 40 minutes), the coverings are peeled off with a peeling device, and the increase in the peel resistance (in N/5 cm) is ascertained.

Determination of the Dry Grip:

The formulation is applied as an adhesive with serrated strip TKB A2 to fiber cement slabs (e.g., Eternit® 2000, 500×200 mm) in peel direction. The amount applied is about 280-320 g/m². PVC strips (Tarkett standard 2 mm; 150×50×2 mm) are laid into the bed of adhesive after different venting times (40, 50, 60 and 70 minutes), and are pressed down with a 2.5 kg roller by rolling back and forth three times. Subsequently the strips are peeled off with a peel instrument, and the increase in the peel resistance (in N/5 cm) is ascertained.

Table 3 below contrasts the inventive formulation and the comparative formulation 1 b. As is evident from table 3, the inventive formulation has an improved dry grip with retained wet grab.

TABLE 3

| Test | Testing after | Venting time | Comparative formulation 1b (in N/5 cm) | Formulation 2 (in N/5 cm) |
|---|---|---|---|---|
| Wet grab | 10 min | 10 min | 1 | 2 |
|  | 20 min | 10 min | 4 | 4 |
|  | 30 min | 10 min | 4 | 6 |
|  | 40 min | 10 min | 7 | 10 |
| Dry grip | 40 min | 40 min | 4 | 12 |
|  | 50 min | 50 min | 11 | 19 |
|  | 60 min | 60 min | 13 | 34 |
|  | 70 min | 70 min | 17 | 22 |

Example 3

A glass reactor equipped with a stirrer, metering facilities, temperature sensor, and reflux condenser was charged at room temperature with a mixture of 266.35 g of water, 4.22 g of a 9.1 wt % strength aqueous solution of L(+)-ascorbic acid, 0.58 g of a 33 wt % aqueous polystyrene seed dispersion (average particle diameter 32 nm), and 205.73 g of a maltodextrin (DE value 16.5-19.9), and this initial charge was flushed with nitrogen and heated to 85° C. with stirring. When the temperature was reached, 10% of feed 1 was added to the reactor over the course of 2 minutes, and was incorporated by stirring at this temperature for 3 minutes. Then the remainder of feed 1, and also feed 2, were commenced simultaneously and added in the following way, with the aforementioned temperature maintained: a) feed 1: 59.6% of the remaining feed 1 was added over 2 h 15 min, after which the remainder of feed 1 (40.4%) was added over 1 h. b) Feed 2 was added using the following metering profile: successive feed of 1.16% in 7 min, 2.31% in 8 min, 3.47% in 7 min, 4.62% in 8 min, 78.73% in 2 h 17 min, 1.5% in 3 min, 0.75% in 2 min and 7.46% in 23 min.

Feed 1: 27.43 g of 7 wt % strength aqueous solution of sodium persulfate

Feed 2: 86.24 g of water
  72.00 g of 20 wt % strength aqueous solution of sodium dodecylbenzylsulfonate
  12.00 g of acrylic acid (AA)
  0.24 g of 2-ethylhexyl thioglycolate
  144.00 g of 2-ethylhexyl acrylate (EHA)
  48.00 g of acrylonitrile (AN)
  276.00 g of n-butyl acrylate (nBA)

Then 8.98 g of water were added to the reactor and the reaction mixture was stirred at 85° C. for 30 minutes, followed by addition of a further 13.49 g of water. For chemical deodorization, the following two mixtures were added in the form of two separate feeds with a constant feed rate over 2 hours: a) 20.16 g of a 10% strength aqueous solution of tert-butyl hydroperoxide, b) 19.42 g of a 13.1% strength solution of sodium acetone bisulfite and 1.01 g of water. After 30 minutes the temperature was lowered continuously to 70° C. over the course of 15 minutes, and was then maintained at that temperature, with a gentle stream of nitrogen being passed through the apparatus and through an attached cold trap containing dry ice. Then 5.76 g of a 25% strength aqueous ammonia solution were added over the course of 30 minutes, followed by addition of 55.30 g of water. The dispersion was cooled to room temperature, biocides were added, and it was filtered.

The dispersion obtained in the example has a solids content of 53.8% with a pH of 5.7. The LT is 72 [the average particle diameter is determined by the method of quasi-elastic light scattering (ISO standard 13 321)] and the viscosity is 188 mPas (measured at 500 revolutions per second).

Formulation for Example 3:

Formulation 3 is prepared from the polymer dispersion prepared in example 3, and further components. Comparative dispersion 1 is formulated in exactly the same way, to give comparative formulation 1c. Formulation 3 and comparative formulation 1c are prepared as follows:

With stirring, and at 23° C., the 27.3 parts by weight of dispersion are admixed with 8.6 parts by weight of Rheovis AS 1125 (thickener; for formulation 3 in the form of a 2% strength solution, for the comparative formulation in the form of a 3% strength solution). Then 19 parts by weight of a hot resin mixture (tackifier; mixture consisting of 50 wt % Dercol M10, 50 wt % Bremasin 1601; heated to 95° C. prior to the addition) are added with stirring over the course of 15 minutes, followed by stirring for 10 minutes more. 0.5 part by weight of Emulphor FAS30 (emulsifier), 0.3 part by weight of FoamStar SI 2210 (defoamer), 1.0 part by weight of Dispex AA4135 (pigment disperser), and 0.4 part by weight of Hydropalat WE 3185 (wetting agent) are added in succession with stirring. Then 42.9 parts by weight of Omyacarb 10 GU (filler) are mixed in with stirring, followed by stirring for 10 minutes more.

Determination of the Wet Grab:

The formulation is applied as an adhesive with serrated strip TKB B 1 to fiber cement slabs (e.g., Eternit® 2000, 500×200 mm) in peel direction. The amount applied is about 300-350 g/m$^2$. NFC (Finett 11 needlefelt floorcovering) strips (150×50×5.2 mm) are laid into the bed of adhesive after venting for 10 minutes, and are pressed down with a 2.5 kg roller by rolling back and forth three times. At time intervals (10, 20, 30, and 40 minutes), the coverings are peeled off with a peeling device, and the increase in the peel resistance (in N/5 cm) is ascertained.

Determination of the Dry Grip:

The formulation is applied as an adhesive with serrated strip TKB A2 to fiber cement slabs (e.g., Eternit® 2000, 500×200 mm) in peel direction. The amount applied is about 280-320 g/m$^2$. PVC strips (Tarkett standard 2 mm; 150× 50×2 mm) are laid into the bed of adhesive after different venting times (30, 40, 50, and 60 minutes), and are pressed down with a 2.5 kg roller by rolling back and forth three times. Subsequently the strips are peeled off with a peel instrument, and the increase in the peel resistance (in N/5 cm) is ascertained.

Table 4 below contrasts inventive formulation 3 and the comparative formulation 1c. As is evident from table 4, the inventive formulation has an improved dry grip with retained wet grab.

TABLE 4

| Test | Testing after | Venting time | Comparative formulation 1c (in N/5 cm) | Formulation 3 (in N/5 cm) |
| --- | --- | --- | --- | --- |
| Wet grab | 10 min | 10 min | 3 | 12 |
|  | 20 min | 10 min | 18 | 27 |
|  | 30 min | 10 min | 30 | 30 |
|  | 40 min | 10 min | 38 | 34 |
| Dry grip | 30 min | 30 min | 16 | 14 |
|  | 40 min | 40 min | 10 | 21 |
|  | 50 min | 50 min | 12 | 18 |
|  | 60 min | 60 min | 9 | 18 |

Example 4

A glass reactor equipped with a stirrer, metering facilities, temperature sensor, and reflux condenser was charged at room temperature with a mixture of 266.35 g of water, 4.22 g of a 9.1 wt % strength aqueous solution of L(+)-ascorbic acid, 0.58 g of a 33 wt % aqueous polystyrene seed dispersion (average particle diameter 32 nm), and 205.73 g of a maltodextrin (DE value 16.5-19.9), and this initial charge was flushed with nitrogen and heated to 85° C. with stirring. When the temperature was reached, 10% of feed 1 was added to the reactor over the course of 2 minutes, and was incorporated by stirring at this temperature for 3 minutes. Then the remainder of feed 1, and also feed 2, were commenced simultaneously and added in the following way, with the aforementioned temperature maintained: a) feed 1: 59.6% of the remaining feed 1 was added over 2 h 15 min, after which the remainder of feed 1 (40.4%) was added over 1 h. b) Feed 2 was added using the following metering profile: successive feed of 1.16% in 7 min, 2.31% in 8 min, 3.47% in 7 min, 4.62% in 8 min, 78.73% in 2 h 17 min, 1.5% in 3 min, 0.75% in 2 min and 7.46% in 23 min.

Feed 1: 39.09 g of 7 wt % strength aqueous solution of sodium persulfate
Feed 2: 86.24 g of water
  72.00 g of 20 wt % strength aqueous solution of sodium dodecylbenzylsulfonate
  12.00 g of acrylic acid (AA)
  0.24 g of 2-ethylhexyl thioglycolate
  48.00 g of 2-ethylhexyl acrylate (EHA)
  4.80 g of styrene (S)
  48.00 g of acrylonitrile (AN)
  367.20 g of n-butyl acrylate (nBA)

Then 8.98 g of water were added to the reactor and the reaction mixture was stirred at 85° C. for 30 minutes, followed by addition of a further 13.49 g of water. For chemical deodorization, the following two mixtures were added in the form of two separate feeds with a constant feed rate over 2 hours: a) 20.16 g of a 10% strength aqueous solution of tert-butyl hydroperoxide, b) 19.42 g of a 13.1% strength solution of sodium acetone bisulfite and 1.01 g of water. After 30 minutes the temperature was lowered continuously to 70° C. over the course of 15 minutes, and was then maintained at that temperature, with a gentle stream of nitrogen being passed through the apparatus and through an attached cold trap containing dry ice. Then 5.76 g of a 25% strength aqueous ammonia solution were added over the course of 30 minutes, followed by addition of 63.94 g of water. The dispersion was cooled to room temperature, biocides were added, and it was filtered.

The dispersion obtained in the example has a solids content of 54.6% with a pH of 5.8. The LT is 74 [the average particle diameter is determined by the method of quasi-elastic light scattering (ISO standard 13 321)] and the viscosity is 211 mPas (measured at 500 revolutions per second).

Formulation for Example 4

Formulation 4 is prepared from the polymer dispersion prepared in example 4, and further components. Comparative dispersion 1 is formulated in exactly the same way, to give comparative formulation 1d. Formulation 4 and comparative formulation 1d are prepared as follows:

With stirring, and at 23° C., the 40 parts by weight of dispersion are admixed with 5.5 parts by weight of Rheovis AS 1125 (thickener; for formulation 4 in the form of a 3% strength solution, for comparative formulation 1d in the form of a 6% strength solution). Then 15 parts by weight of a hot resin mixture (tackifier; mixture consisting of 50 wt % Dercol M10, 50 wt % Bremasin 1601; heated to 95° C. prior to the addition) are added with stirring over the course of 15 minutes, followed by stirring for 10 minutes more. 1 part by weight of Emulphor FAS30 (emulsifier), 0.3 part by weight of FoamStar SI 2210 (defoamer), 1.0 part by weight of Dispex AA4135 (pigment disperser), and 0.2 part by weight of Hydropalat WE 3185 (wetting agent) are added in succession with stirring. Then 37 parts by weight of Omyacarb 10 GU (filler) are mixed in with stirring, followed by stirring for 10 minutes more.

Determination of the Wet Grab:

The formulation is applied as an adhesive with serrated strip TKB B 1 to fiber cement slabs (e.g., Eternit® 2000, 500×200 mm) in peel direction. The amount applied is about 300-350 g/m². NFC (Finett 11 needlefelt floorcovering) strips (150×50×5.2 mm) are laid into the bed of adhesive after venting for 10 minutes, and are pressed down with a 2.5 kg roller by rolling back and forth three times. At time intervals (10, 20, 30, and 40 minutes), the coverings are peeled off with a peeling device, and the increase in the peel resistance (in N/5 cm) is ascertained.

Determination of the Dry Grip:

The formulation is applied as an adhesive with serrated strip TKB A2 to fiber cement slabs (e.g., Eternit® 2000, 500×200 mm) in peel direction. The amount applied is about 280-320 g/m². PVC strips (Tarkett standard 2 mm; 150× 50×2 mm) are laid into the bed of adhesive after different venting times (30, 40, 50, and 60 minutes), and are pressed down with a 2.5 kg roller by rolling back and forth three times. Subsequently the strips are peeled off with a peel instrument, and the increase in the peel resistance (in N/5 cm) is ascertained.

Table 5 below contrasts inventive formulation 4 and the comparative formulation 1d. As is evident from table 5, inventive formulation 4 has an improved dry grip with retained wet grab.

TABLE 5

| Test | Testing after | Venting time | Comparative formulation 1d (in N/5 cm) | Formulation 4 (in N/5 cm) |
|---|---|---|---|---|
| Wet grab | 10 min | 10 min | 2 | 20 |
|  | 20 min | 10 min | 6 | 33 |
|  | 30 min | 10 min | 15 | 41 |
|  | 40 min | 10 min | 25 | 42 |
| Dry grip | 30 min | 30 min | 3 | 27 |
|  | 40 min | 40 min | 10 | 35 |
|  | 50 min | 50 min | 25 | 37 |
|  | 60 min | 60 min | 30 | 35 |

Comparative Examples 2, 3, 4, 5, and 6

In comparative examples 2, 3, 4, 5, and 6, dispersions were prepared with at least 30 wt % of an ethylenically unsaturated monomer whose homopolymer has a glass transition temperature 50° C. The intention in so doing is to show that in a flooring adhesive formulation, a dispersion of this kind does not permit improved dry grip with retained wet grab, in contrast to an inventive dispersion (examples 1 to 4).

Comparative Example 2

A glass reactor equipped with a stirrer, metering facilities, temperature sensor, and reflux condenser was charged at room temperature with a mixture of 266.35 g of water, 4.22 g of a 9.1 wt % strength aqueous solution of L(+)-ascorbic acid, 0.58 g of a 33 wt % aqueous polystyrene seed dispersion (average particle diameter 32 nm), and 205.73 g of a maltodextrin (DE value 16.5-19.9), and this initial charge was flushed with nitrogen and heated to 85° C. with stirring. When the temperature was reached, 10% of feed 1 was added to the reactor over the course of 2 minutes, and was incorporated by stirring at this temperature for 3 minutes. Then the remainder of feed 1, and also feed 2, were commenced simultaneously and added in the following way, with the aforementioned temperature maintained: a) feed 1: 59.6% of the remaining feed 1 was added over 2 h 15 min, after which the remainder of feed 1 (40.4%) was added over 1 h. b) Feed 2 was added using the following metering profile: successive feed of 1.16% in 7 min, 2.31% in 8 min, 3.47% in 7 min, 4.62% in 8 min, 78.73% in 2 h 17 min, 1.5% in 3 min, 0.75% in 2 min and 7.46% in 23 min.

Feed 1: 39.09 g of 7 wt % strength aqueous solution of sodium persulfate
Feed 2: 86.24 g of water
  72.00 g of 20 wt % strength aqueous solution of sodium dodecylbenzylsulfonate
  12.00 g of acrylic acid (AA)
  0.24 g of 2-ethylhexyl thioglycolate
  48.00 g of 2-ethylhexyl acrylate (EHA)
  144.00 g of styrene (S)
  48.00 g of acrylonitrile (AN)
  228.00 g of n-butyl acrylate (nBA)

Then 8.98 g of water were added to the reactor and the reaction mixture was stirred at 85° C. for 30 minutes, followed by addition of a further 13.49 g of water. For chemical deodorization, the following two mixtures were added in the form of two separate feeds with a constant feed rate over 2 hours: a) 20.16 g of a 10% strength aqueous solution of tert-butyl hydroperoxide, b) 19.42 g of a 13.1% strength solution of sodium acetone bisulfite and 1.01 g of water. After 30 minutes the temperature was lowered continuously to 70° C. over the course of 15 minutes, and then maintained at that temperature, with a gentle stream of nitrogen being passed through the apparatus and through an attached cold trap containing dry ice. Then 5.76 g of a 25% strength aqueous ammonia solution were added over the course of 30 minutes, followed by addition of 63.94 g of water. The dispersion was cooled to room temperature, biocides were added, and it was filtered.

The dispersion obtained in the example has a solids content of 54.2% with a pH of 5.5. The LT is 68 [the average particle diameter is determined by the method of quasi-elastic light scattering (ISO standard 13 321)] and the viscosity is 300 mPas (measured at 500 revolutions per second).

Comparative Example 3

A glass reactor equipped with a stirrer, metering facilities, temperature sensor, and reflux condenser was charged at room temperature with a mixture of 266.35 g of water, 4.22 g of a 9.1 wt % strength aqueous solution of L(+)-ascorbic acid, 0.58 g of a 33 wt % aqueous polystyrene seed dispersion (average particle diameter 32 nm), and 205.73 g of a maltodextrin (DE value 16.5-19.9), and this initial charge was flushed with nitrogen and heated to 85° C. with stirring. When the temperature was reached, 10% of feed 1 was added to the reactor over the course of 2 minutes, and was incorporated by stirring at this temperature for 3 minutes. Then the remainder of feed 1, and also feed 2, were commenced simultaneously and added in the following way, with the aforementioned temperature maintained: a) feed 1: 59.6% of the remaining feed 1 was added over 2 h 15 min, after which the remainder of feed 1 (40.4%) was added over 1 h. b) Feed 2 was added using the following metering profile: successive feed of 1.16% in 7 min, 2.31% in 8 min, 3.47% in 7 min, 4.62% in 8 min, 78.73% in 2 h 17 min, 1.5% in 3 min, 0.75% in 2 min and 7.46% in 23 min.
Feed 1: 39.09 g of 7 wt % strength aqueous solution of sodium persulfate
Feed 2: 86.24 g of water
  72.00 g of 20 wt % strength aqueous solution of sodium dodecylbenzylsulfonate
  12.00 g of acrylic acid (AA)
  0.24 g of 2-ethylhexyl thioglycolate
  48.00 g of 2-ethylhexyl acrylate (EHA)
  144.00 g of methyl methacrylate (MMA)
  48.00 g of acrylonitrile (AN)
  228.00 g of n-butyl acrylate (nBA)

Then 8.98 g of water were added to the reactor and the reaction mixture was stirred at 85° C. for 30 minutes, followed by addition of a further 13.49 g of water. For chemical deodorization, the following two mixtures were added in the form of two separate feeds with a constant feed rate over 2 hours: a) 20.16 g of a 10% strength aqueous solution of tert-butyl hydroperoxide, b) 19.42 g of a 13.1% strength solution of sodium acetone bisulfite and 1.01 g of water. After 30 minutes the temperature was lowered continuously to 70° C. over the course of 15 minutes, and then maintained at that temperature, with a gentle stream of nitrogen being passed through the apparatus and through an attached cold trap containing dry ice. Then 5.76 g of a 25% strength aqueous ammonia solution were added over the course of 30 minutes, followed by addition of 63.94 g of water. The dispersion was cooled to room temperature, biocides were added, and it was filtered.

The dispersion obtained in the example has a solids content of 53.7% with a pH of 6.3. The LT is 80 [the average particle diameter is determined by the method of quasi-elastic light scattering (ISO standard 13 321)] and the viscosity is 256 mPas (measured at 500 revolutions per second).

Comparative Example 4

A glass reactor equipped with a stirrer, metering facilities, temperature sensor, and reflux condenser was charged at room temperature with a mixture of 266.35 g of water, 4.22 g of a 9.1 wt % strength aqueous solution of L(+)-ascorbic acid, 0.58 g of a 33 wt % aqueous polystyrene seed dispersion (average particle diameter 32 nm), and 205.73 g of a maltodextrin (DE value 16.5-19.9), and this initial charge was flushed with nitrogen and heated to 85° C. with stirring. When the temperature was reached, 10% of feed 1 was added to the reactor over the course of 2 minutes, and was incorporated by stirring at this temperature for 3 minutes. Then the remainder of feed 1, and also feed 2, were commenced simultaneously and added in the following way, with the aforementioned temperature maintained: a) feed 1: 59.6% of the remaining feed 1 was added over 2 h 15 min, after which the remainder of feed 1 (40.4%) was added over 1 h. b) Feed 2 was added using the following metering profile: successive feed of 1.16% in 7 min, 2.31% in 8 min, 3.47% in 7 min, 4.62% in 8 min, 78.73% in 2 h 17 min, 1.5% in 3 min, 0.75% in 2 min and 7.46% in 23 min.
Feed 1: 39.09 g of 7 wt % strength aqueous solution of sodium persulfate
Feed 2: 86.24 g of water
  72.00 g of 20 wt % strength aqueous solution of sodium dodecylbenzylsulfonate
  12.00 g of acrylic acid (AA)
  0.24 g of 2-ethylhexyl thioglycolate
  48.00 g of 2-ethylhexyl acrylate (EHA)
  144.00 g of tert-butyl acrylate (tBA)
  48.00 g of acrylonitrile (AN)
  228.00 g of n-butyl acrylate (nBA)

Then 8.98 g of water were added to the reactor and the reaction mixture was stirred at 85° C. for 30 minutes, followed by addition of a further 13.49 g of water. For chemical deodorization, the following two mixtures were added in the form of two separate feeds with a constant feed rate over 2 hours: a) 20.16 g of a 10% strength aqueous solution of tert-butyl hydroperoxide, b) 19.42 g of a 13.1% strength solution of sodium acetone bisulfite and 1.01 g of water. After 30 minutes the temperature was lowered continuously to 70° C. over the course of 15 minutes, and then maintained at that temperature, with a gentle stream of nitrogen being passed through the apparatus and through an attached cold trap containing dry ice. Then 5.76 g of a 25% strength aqueous ammonia solution were added over the course of 30 minutes, followed by addition of 63.94 g of water. The dispersion was cooled to room temperature, biocides were added, and it was filtered.

The dispersion obtained in the example has a solids content of 54.2% with a pH of 5.2. The LT is 73 [the average particle diameter is determined by the method of quasi-elastic light scattering (ISO standard 13 321)] and the viscosity is 233 mPas (measured at 500 revolutions per second).

Comparative Example 5

A glass reactor equipped with a stirrer, metering facilities, temperature sensor, and reflux condenser was charged at room temperature with a mixture of 266.35 g of water, 4.22 g of a 9.1 wt % strength aqueous solution of L(+)-ascorbic acid, 0.58 g of a 33 wt % aqueous polystyrene seed dispersion (average particle diameter 32 nm), and 205.73 g of a maltodextrin (DE value 16.5-19.9), and this initial charge was flushed with nitrogen and heated to 85° C. with stirring. When the temperature was reached, 10% of feed 1 was added to the reactor over the course of 2 minutes, and was incorporated by stirring at this temperature for 3 minutes. Then the remainder of feed 1, and also feed 2, were commenced simultaneously and added in the following way, with the aforementioned temperature maintained: a) feed 1: 59.6% of the remaining feed 1 was added over 2 h 15 min, after which the remainder of feed 1 (40.4%) was added over 1 h. b) Feed 2 was added using the following metering profile: successive feed of 1.16% in 7 min, 2.31% in 8 min, 3.47% in 7 min, 4.62% in 8 min, 78.73% in 2 h 17 min, 1.5% in 3 min, 0.75% in 2 min and 7.46% in 23 min.

Feed 1: 39.09 g of 7 wt % strength aqueous solution of sodium persulfate
Feed 2: 86.24 g of water
   72.00 g of 20 wt % strength aqueous solution of sodium dodecylbenzylsulfonate
   12.00 g of acrylic acid (AA)
   0.24 g of 2-ethylhexyl thioglycolate
   48.00 g of 2-ethylhexyl acrylate (EHA)
   192.00 g of styrene (S)
   48.00 g of acrylonitrile (AN)
   228.00 g of n-butyl acrylate (nBA)

Then 8.98 g of water were added to the reactor and the reaction mixture was stirred at 85° C. for 30 minutes, followed by addition of a further 13.49 g of water. For chemical deodorization, the following two mixtures were added in the form of two separate feeds with a constant feed rate over 2 hours: a) 20.16 g of a 10% strength aqueous solution of tert-butyl hydroperoxide, b) 19.42 g of a 13.1% strength solution of sodium acetone bisulfite and 1.01 g of water. After 30 minutes the temperature was lowered continuously to 70° C. over the course of 15 minutes, and then maintained at that temperature, with a gentle stream of nitrogen being passed through the apparatus and through an attached cold trap containing dry ice. Then 5.76 g of a 25% strength aqueous ammonia solution were added over the course of 30 minutes, followed by addition of 63.94 g of water. The dispersion was cooled to room temperature, biocides were added, and it was filtered.

The dispersion obtained in the example has a solids content of 54.1% with a pH of 6.0. The LT is 71 [the average particle diameter is determined by the method of quasi-elastic light scattering (ISO standard 13 321)] and the viscosity is 312 mPas (measured at 500 revolutions per second).

Comparative Example 6

A glass reactor equipped with a stirrer, metering facilities, temperature sensor, and reflux condenser was charged at room temperature with a mixture of 266.35 g of water, 4.22 g of a 9.1 wt % strength aqueous solution of L(+)-ascorbic acid, 0.58 g of a 33 wt % aqueous polystyrene seed dispersion (average particle diameter 32 nm), and 205.73 g of a maltodextrin (DE value 16.5-19.9), and this initial charge was flushed with nitrogen and heated to 85° C. with stirring. When the temperature was reached, 10% of feed 1 was added to the reactor over the course of 2 minutes, and was incorporated by stirring at this temperature for 3 minutes. Then the remainder of feed 1, and also feed 2, were commenced simultaneously and added in the following way, with the aforementioned temperature maintained: a) feed 1: 59.6% of the remaining feed 1 was added over 2 h 15 min, after which the remainder of feed 1 (40.4%) was added over 1 h. b) Feed 2 was added using the following metering profile: successive feed of 1.16% in 7 min, 2.31% in 8 min, 3.47% in 7 min, 4.62% in 8 min, 78.73% in 2 h 17 min, 1.5% in 3 min, 0.75% in 2 min and 7.46% in 23 min.

Feed 1: 39.09 g of 7 wt % strength aqueous solution of sodium persulfate
Feed 2: 86.24 g of water
   72.00 g of 20 wt % strength aqueous solution of sodium dodecylbenzylsulfonate
   12.00 g of acrylic acid (AA)
   0.24 g of 2-ethylhexyl thioglycolate
   48.00 g of 2-ethylhexyl acrylate (EHA)
   288.00 g of styrene (S)
   48.00 g of acrylonitrile (AN)
   108.00 g of n-butyl acrylate (nBA)

Then 8.98 g of water were added to the reactor and the reaction mixture was stirred at 85° C. for 30 minutes, followed by addition of a further 13.49 g of water. For chemical deodorization, the following two mixtures were added in the form of two separate feeds with a constant feed rate over 2 hours: a) 20.16 g of a 10% strength aqueous solution of tert-butyl hydroperoxide, b) 19.42 g of a 13.1% strength solution of sodium acetone bisulfite and 1.01 g of water. After 30 minutes the temperature was lowered continuously to 70° C. over the course of 15 minutes, and then maintained at that temperature, with a gentle stream of nitrogen being passed through the apparatus and through an attached cold trap containing dry ice. Then 5.76 g of a 25% strength aqueous ammonia solution were added over the course of 30 minutes, followed by addition of 63.94 g of water. The dispersion was cooled to room temperature, biocides were added, and it was filtered.

The dispersion obtained in the example has a solids content of 54.3% with a pH of 6.7. The LT is 64 [the average particle diameter is determined by the method of quasi-elastic light scattering (ISO standard 13 321)] and the viscosity is 292 mPas (measured at 500 revolutions per second).

Formulation of Comparative Examples 2, 3, 4, 5, and 6

Comparative formulations, 2, 3, 4, 5, and 6 are prepared from the polymer dispersions prepared in comparative examples 2, 3, 4, 5, and 6, and further components. Comparative dispersion 1 is formulated in the same way, to produce comparative formulation 1e. Comparative formulations 2, 3, 4, 5, and 6 and comparative formulation 1e are prepared as follows:

With stirring, and at 23° C., the 27.3 parts by weight of dispersion are admixed with 8.6 parts by weight of Rheovis AS 1125 (thickener; for comparative formulations 2, 3, 4, 5, and 6, in the form of a 2% strength solution; for comparative formulation 1e, in the form of a 3% strength solution). Then 19 parts by weight of a hot resin mixture (tackifier; mixture consisting of 50 wt % Dercol M10, 50 wt % Bremasin 1601; heated to 95° C. prior to the addition) are added with stirring over the course of 15 minutes, followed by stirring for 10 minutes more. 0.5 part by weight of Emulphor FAS30 (emulsifier), 0.3 part by weight of FoamStar SI 2210 (defoamer), 1.0 part by weight of Dispex AA4135 (pigment disperser), and 0.4 part by weight of Hydropalat WE 3185 (wetting agent) are added in succession with stirring. Then 42.9 parts by weight of Omyacarb 10 GU (filler) are mixed in with stirring, followed by stirring for 10 minutes more.

Determination of the Wet Grab:

The formulation is applied as an adhesive with serrated strip TKB B 1 to fiber cement slabs (e.g., Eternit® 2000, 500×200 mm) in peel direction. The amount applied is about 300-350 g/m². NFC (Finett 11 needlefelt floorcovering) strips (150×50×5.2 mm) are laid into the bed of adhesive after venting for 10 minutes, and are pressed down with a 2.5 kg roller by rolling back and forth three times. At time intervals (10, 20, 30, and 40 minutes), the coverings are peeled off with a peeling device, and the increase in the peel resistance (in N/5 cm) is ascertained.

Determination of the Dry Grip:

The formulation is applied as an adhesive with serrated strip TKB A2 to fiber cement slabs (e.g., Eternit® 2000, 500×200 mm) in peel direction. The amount applied is about 280-320 g/m². PVC strips (Tarkett standard 2 mm; 150× 50×2 mm) are laid into the bed of adhesive after different venting times (30, 40, 50, and 60 minutes), and are pressed down with a 2.5 kg roller by rolling back and forth three times. Subsequently the strips are peeled off with a peel instrument, and the increase in the peel resistance (in N/5 cm) is ascertained.

Table 6 below contrasts comparative formulations 2, 3, 4, 5, and 6 with comparative formulation 1e. As is evident from table 6, the comparative formulations 2, 3, 4, 5, and 6 prepared from the noninventive comparative dispersions 2, 3, 4, 5, and 6 do not have improved dry grip with retained wet grab, in comparison to comparative dispersion 1e.

What is claimed is:

1. A polymer dispersion, comprising:
   A) at least one first phase, comprising:
      a) at least one chain growth addition polymer P, having a glass transition temperature Tg of ≤−10° C. and being solely constructed from
         1 to 99.9 wt % of at least one ester from ethylenically unsaturated monomers, as monomer A,
         0 to 20 wt % of at least one ethylenically unsaturated carbonitrile, as monomer B,
         0.1 to 5 wt % of at least one acid-functional ethylenically unsaturated monomer, as monomer C,
         0 to 5 wt % of at least one monomer which, alone or with a crosslinking agent, has crosslinking effect and which is different from the monomers A to C, as monomer D,
         0 to 20 wt % of at least one ethylenically unsaturated monomer which forms a chain growth addition homopolymer having a glass transition temperature ≥50° C. and which is different from the monomers A to D, as monomer E, selected from the group consisting of styrene, α-methylstyrene, o- or p-vinyltoluene, p-acetoxystyrene, p-bromostyrene, p-tert-butylstyrene, o-, m-, or p-chlorostyrene, methyl methacrylate, tert-butyl acrylate, tert-butyl methacrylate, ethyl methacrylate, isobutyl methacrylate, cyclohexyl methacrylate, tert-butyl vinyl ether, and cyclohexyl vinyl ether,
      the sum of the total amount of the monomers A to E making 100 wt %,
      a1) optionally at least one polymer seed,
      b) 10 to 60 parts by weight, based on 100 parts by weight of polymer P, of at least one saccharide compound S, and
   B) a second phase comprising at least one solvent.

2. The polymer dispersion according to claim 1, which is an aqueous polymer dispersion.

3. The polymer dispersion according to claim 1, wherein the monomer B is acrylonitrile and/or methacrylonitrile.

4. The polymer dispersion according to claim 1, wherein the saccharide compound S is at least one member selected from the group consisting of starch, cellulose, guaran, xanthan, alginate, pectin, chitosan, gum arabic, and gellan.

5. The polymer dispersion according to claim 1, wherein saccharide compound S is a starch, starch derivative and/or a substitution product thereof.

6. The polymer dispersion according to claim 1, wherein the saccharide compound S has a DE (dextrose equivalent) value in a range from 1 to 40.

TABLE 6

| Test | Testing after | Venting time | Comparative formulation 1e (in N/5 cm) | Comparative formulation 2 (in N/5 cm) | Comparative formulation 3 (in N/5 cm) | Comparative formulation 4 (in N/5 cm) | Comparative formulation 5 (in N/5 cm) | Comparative formulation 6 (in N/5 cm) |
|---|---|---|---|---|---|---|---|---|
| Wet grab | 10 min | 10 min | 6 | 8 | 11 | 15 | 5 | 1 |
|  | 20 min | 10 min | 15 | 22 | 22 | 27 | 14 | 4 |
|  | 30 min | 10 min | 26 | 27 | 33 | 28 | 17 | 6 |
|  | 40 min | 10 min | 35 | 35 | 34 | 43 | 15 | 8 |
| Dry grip | 30 min | 30 min | 6 | 17 | 21 | 24 | 11 | 3 |
|  | 40 min | 40 min | 16 | 20 | 16 | 28 | 8 | 3 |
|  | 50 min | 50 min | 20 | 13 | 6 | 7 | 4 | 2 |
|  | 60 min | 60 min | 18 | 6 | 3 | 6 | 1 | 1 |

7. The polymer dispersion according to claim 1, wherein the saccharide compound S is maltodextrin.

8. A chain growth addition polymer powder obtained by drying the polymer dispersion according to claim 1.

9. An aqueous formulation for adhesive bonding, comprising:
   i) the polymer dispersion according to claim 1 as binder, the formulation having a solids content originating from the polymer dispersion or from the polymer powder of 5 to 90 wt %, based on the total solids content of the formulation.

10. The formulation according to claim 9, further comprising ii) at least one filler.

11. The formulation according to claim 10, wherein the filler is calcium carbonate having an average particle diameter of 2 to 50 µm or is finely ground quartz having an average particle diameter of 3 to 50 µm, or is a combination of the two substances.

12. The formulation according to claim 9, further comprising iii) at least one tackifier.

13. An aqueous formulation for adhesive bonding, comprising:
   i) the chain growth addition polymer powder according to claim 8, as binder, the formulation having a solids content originating from the polymer dispersion or from the polymer powder of 5 to 90 wt %, based on the total solids content of the formulation.

14. A polymer dispersion, comprising: A) at least one first phase, comprising: a) at least one chain growth addition polymer P solely constructed from 1 to 99.9 wt % of at least one ester from ethylenically unsaturated monomers, as monomers A, 0 to 20 wt % of at least one ethylenically unsaturated carbonitrile, as monomer B, 0.1 to 5 wt % of at least one acid-functional ethylenically unsaturated monomer, as monomer C, 0 to 5 wt % of at least one monomer which, alone or with a crosslinking agent, has crosslinking effect and which is different from the monomers A to C, as monomer D, 0 to 20 wt % of at least one ethylenically unsaturated monomer which forms a chain growth addition homopolymer having a glass transition temperature ≥50° C. and which is different from the monomers A to D, as monomer E, selected from the group consisting of styrene, α-methylstyrene, o- or p-vinyltoluene, p-acetoxystyrene, p-bromostyrene, p-tert-butylstyrene, o-, m-, or p-chlorostyrene, methyl methacrylate, tert-butyl acrylate, tert-butyl methacrylate, ethyl methacrylate, isobutyl methacrylate, cyclohexyl methacrylate, tert-butyl vinyl ether, and cyclohexyl vinyl ether, the sum of the total amount of the monomers A to E making 100 wt %, a1) optionally at least one polymer seed, b) 10 to 60 parts by weight, based on 100 parts by weight of polymer P, of at least one saccharide compound S, and B) a second phase comprising at least one solvent, wherein the polymer dispersion comprising 45 to 400 parts by weight of solvent, based on 100 parts by weight of chain growth addition polymer P.

15. A chain growth addition polymer powder obtained by drying the polymer dispersion according to claim 14.

16. An aqueous formulation for adhesive bonding, comprising:
   i) the polymer dispersion according to claim 14 as binder, the formulation having a solids content originating from the polymer dispersion or from the polymer powder of 5 to 90 wt %, based on the total solids content of the formulation.

17. An aqueous formulation for adhesive bonding, comprising:
   i) the chain growth addition polymer powder according to claim 15, as binder, the formulation having a solids content originating from the polymer dispersion or from the polymer powder of 5 to 90 wt %, based on the total solids content of the formulation.

18. A method for producing a polymer dispersion according to claim 1, the method comprising:
   I) providing at least one first phase, comprising:
   at least one chain growth addition polymer P solely constructed from
   1 to 99.9 wt % of at least one ester from ethylenically unsaturated monomers, as monomer A,
   0 to 20 wt % of at least one ethylenically unsaturated carbonitrile, as monomer B,
   0.1 to 5 wt % of at least one acid-functional ethylenically unsaturated monomer, as monomer C,
   0 to 5 wt % of at least one monomer which, alone or with a crosslinking agent, has crosslinking effect and which is different from the monomers A to C, as monomer D,
   0 to 20 wt % of at least one ethylenically unsaturated monomer which forms a chain growth addition homopolymer having a glass transition temperature ≥50° C. and which is different from the monomers A to D, as monomer E, selected from the group consisting of styrene, α-methylstyrene, o- or p-vinyltoluene, p-acetoxystyrene, p-bromostyrene, p-tert-butylstyrene, o-, m-, or p-chlorostyrene, methyl methacrylate, tert-butyl acrylate, tert-butyl methacrylate, ethyl methacrylate, isobutyl methacrylate, cyclohexyl methacrylate, tert-butyl vinyl ether, and cyclohexyl vinyl ether,
   the sum of the total amount of the monomers A to E making 100 wt %,
   a1) optionally at least one polymer seed,
   b) 10 to 60 parts by weight, based on 100 parts by weight of polymer P, of at least one saccharide compound S, and
   II) providing a second phase comprising at least one solvent.

* * * * *